US011682124B2

(12) United States Patent
Das et al.

(10) Patent No.: US 11,682,124 B2
(45) Date of Patent: Jun. 20, 2023

(54) SYSTEMS AND METHODS FOR TRANSFERRING MAP DATA BETWEEN DIFFERENT MAPS

(71) Applicant: Lyft, Inc., San Francisco, CA (US)

(72) Inventors: Ritwik Subir Das, Mountain View, CA (US); Kris Richard Efland, Lafayette, CA (US); Nadha Nafeeza Gafoor, Sunnyvale, CA (US); Nastaran Ghadar, Pleasanton, CA (US); Meng Tao, Redwood City, CA (US)

(73) Assignee: Lytt, inc., San Francisco, CA (US)

( * ) Notice: Subject to any disclaimer, the term of this patent is extended or adjusted under 35 U.S.C. 154(b) by 0 days.

(21) Appl. No.: 16/916,029

(22) Filed: Jun. 29, 2020

(65) Prior Publication Data

US 2021/0407114 A1     Dec. 30, 2021

(51) Int. Cl.
| | |
|---|---|
| *G06T 7/33* | (2017.01) |
| *G06T 7/73* | (2017.01) |
| *G06T 3/60* | (2006.01) |
| *G01C 21/00* | (2006.01) |
| *G06T 7/60* | (2017.01) |
| *G06T 3/00* | (2006.01) |

(Continued)

(52) U.S. Cl.
CPC .......... *G06T 7/337* (2017.01); *G01C 21/3833* (2020.08); *G06T 3/0075* (2013.01);
(Continued)

(58) Field of Classification Search
CPC . G06T 17/05; G06T 19/20; G06T 2219/2004; G06T 7/181; G06T 7/337; G01C 21/32
See application file for complete search history.

(56) References Cited

U.S. PATENT DOCUMENTS

2007/0014488 A1*  1/2007  Chen ........................ G06T 7/33
                                                            382/294
2011/0280453 A1*  11/2011  Chen ........................ G06T 7/75
                                                            382/113

(Continued)

OTHER PUBLICATIONS

Morsu. Camera Based Moving Object Detection for Autonomous Driving. Technischen Universitat Chemnitze. 2017, pp. 1-10.

(Continued)

*Primary Examiner* — Jin Cheng Wang
(74) *Attorney, Agent, or Firm* — Lee Sullivan Shea & Smith LLP

(57) ABSTRACT

Examples disclosed herein may involve a computing system that is operable to (i) identify a source map and a target map for transferring map data, where the source map and the target map have different respective coordinate frames and respective coverage areas that at least partially overlap, (ii) select a real-world element for which to transfer previously-created map data from the source map to the target map, (iii) select a source image associated with the source map in which the selected real-world element appears and has been labeled, (iv) select a target image associated with the target map in which the selected real-world element appears, (v) derive a geometric relationship between the source image and the target image, and (vi) use the derived geometric relationship between the source image and the target image to determine a position of the real-world element within the respective coordinate frame of the target map.

20 Claims, 13 Drawing Sheets

(51) Int. Cl.
  *G06T 11/60*  (2006.01)
  *G06T 3/20*  (2006.01)
(52) U.S. Cl.
  CPC .................. *G06T 3/20* (2013.01); *G06T 3/60* (2013.01); *G06T 7/60* (2013.01); *G06T 7/74* (2017.01); *G06T 11/60* (2013.01)

(56) References Cited

U.S. PATENT DOCUMENTS

| | | | |
|---|---|---|---|
| 2014/0107971 A1* | 4/2014 | Engedal | B66D 1/52 702/150 |
| 2016/0179830 A1* | 6/2016 | Schmalstieg | G06F 16/9537 707/722 |
| 2018/0188043 A1* | 7/2018 | Chen | G01C 21/32 |
| 2018/0276863 A1* | 9/2018 | Nerurkar | G01C 21/32 |
| 2020/0011675 A1* | 1/2020 | Yu | G01C 21/32 |
| 2020/0098135 A1* | 3/2020 | Ganjineh | G06F 16/29 |
| 2021/0063200 A1* | 3/2021 | Kroepfl | G01C 21/1652 |
| 2022/0383556 A1* | 12/2022 | Choi | G06V 20/20 |

OTHER PUBLICATIONS

Geng et al. Analysis of Epipolar Geometry Mapping Relation for Digital Frame Camera Images. Zhengzhou Institute at Surveying and Mapping. May 27, 2014, pp. 1-7.

* cited by examiner

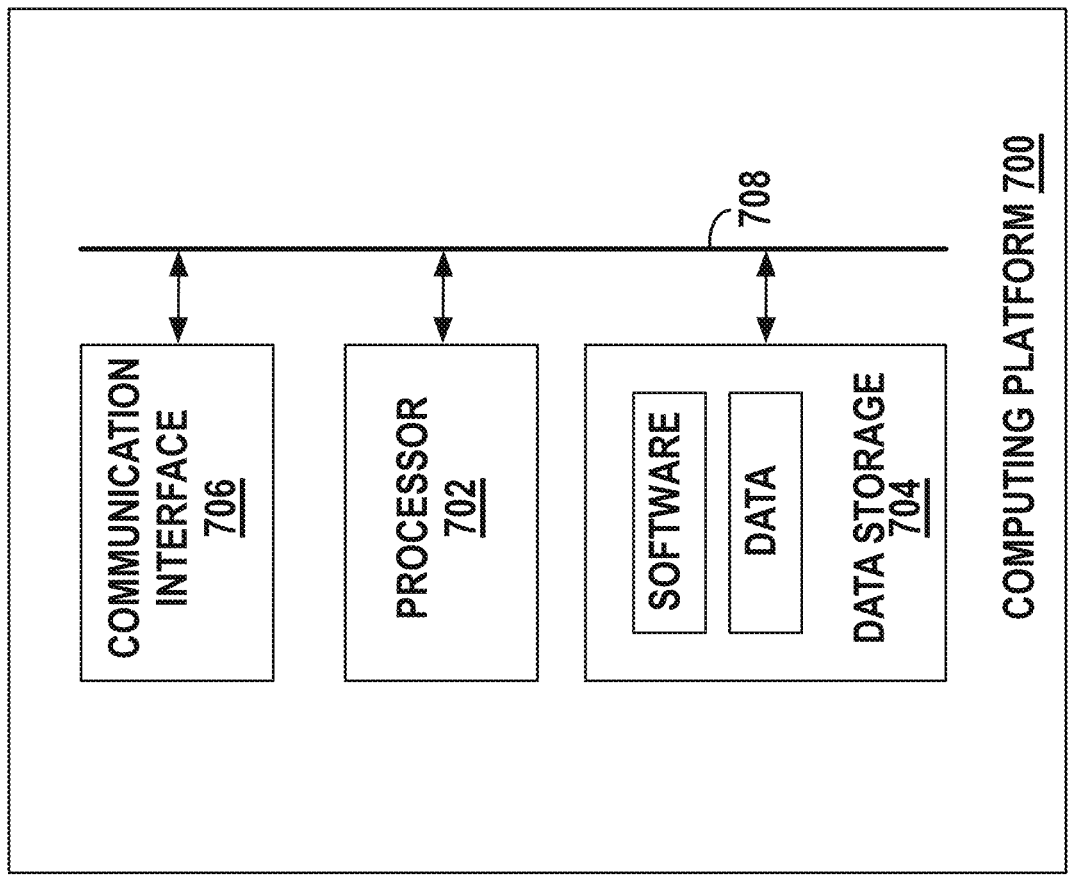

SYSTEMS AND METHODS FOR TRANSFERRING MAP DATA BETWEEN DIFFERENT MAPS

BACKGROUND

Maps play an important role in various areas of technology. As one example of such a technology area, on-board computing systems of vehicles (e.g., autonomy systems and/or advanced driver assistance systems) may use maps when performing operations for vehicles such as localization, perception, prediction, and/or planning, among other possibilities. As another example of such a technology area, transportation-matching platforms may use maps to perform operations such as matching individuals with available vehicles, generating routes for vehicles to follow when picking up and/or transporting individuals, providing estimates of pickup and drop-off times, and/or pre-positioning vehicles within the given area in anticipation of responding to transportation requests, among other possibilities. It should be understood that maps may be used in various other areas of technology as well. As such, there is a need for techniques that are capable of generating accurate, up-to-date maps that can be used for these applications.

SUMMARY

In one aspect, the disclosed technology may take the form of a method that involves (i) identifying a source map and a target map for transferring map data, where the source map and the target map have different respective coordinate frames, and where the source map and the target map have respective coverage areas that at least partially overlap, (ii) selecting a real-world element for which to transfer previously-created map data from the source map to the target map, (iii) selecting a source image associated with the source map in which the selected real-world element appears and has been labeled, (iv) selecting a target image associated with the target map in which the selected real-world element appears, (v) deriving a geometric relationship between the source image and the target image, and (vi) using the derived geometric relationship between the source image and the target image to determine a position of the real-world element within the respective coordinate frame of the target map.

In example embodiments, the real-world element may comprise a semantic element for which a data object has previously been encoded into the source map.

Further, in example embodiments, selecting the real-world element for which to transfer map data from the source map to the target map may comprise determining that a confidence level associated with the previously-created map data for the real-world element satisfies a threshold confidence level.

Further yet, in example embodiments, selecting the target image may comprise (a) determining a capture pose of the source image, (b) comparing the capture pose of the source image to a respective capture pose of each of a plurality of camera images associated with the target map, (c) based on the comparing, identifying one or more camera images associated with the target map having a capture pose that is within both a threshold distance and a threshold rotation of the capture pose of the source image, and (d) selecting the target image from the identified one or more camera images associated with the target map.

Still further, in example embodiments, deriving a geometric relationship between the source image and the target image may comprise (a) identifying feature matches between the source image and the target image, (b) based on the identified feature matches, deriving a first matrix that represents a geometric relationship between pixel positions within the source image and pixel positions within the target image, (c) based on the first matrix and respective camera intrinsics associated with the source and target images, deriving a second matrix that represents a geometric relationship between a camera coordinate frame associated with the source image and a camera coordinate frame associated with the target image, and (d) using the second matrix to determine (1) a rotation offset between the camera coordinate frame associated with the source image and the camera coordinate frame associated with the target image and (2) a translation offset between the camera coordinate frame associated with the source image and the camera coordinate frame associated with the target image, wherein the rotation offset and the translation offset collectively define the geometric relationship between the source image and the target image.

In these example embodiments, using the derived geometric relationship between the source image and the target image to determine a position of the real-world element within the target map may comprise (a) determining a position of the selected real-world element within the camera coordinate frame associated with the source image, (b) using the rotation offset and the translation offset to transform the determined position of the selected real-world element within the camera coordinate frame associated with the source image to a corresponding position of the selected real-world element within the camera coordinate frame associated with the target image, and (c) translating the position of the selected real-world element within the camera coordinate frame associated with the target image to a corresponding position within the respective coordinate frame of the target map.

Further, in these example embodiments, the method may also involve validating the position of the selected real-world element within the camera coordinate frame associated with the target image using epipolar lines that are defined based on the label applied to the source image for the real-world element.

In other example embodiments, the method may further involve, based on the previously-created map data and the determined position for the selected real-world element, encoding map data for the selected real-world element into the target map.

In still other example embodiments, the selected source and target images may comprise a first pair of source and target images. In these example embodiments, the method may further involve (i) selecting one or more additional pairs of source and target images in which the selected real-world element appears, (ii) for each of the one or more additional pairs of source and target images, (a) deriving a geometric relationship between the source and target images in the additional pair and (b) using the derived geometric relationship between the source and target images in the additional pair to determine a respective position of the real-world element within the respective coordinate frame of the target map, and (iii) aggregating the position of the real-world element within the respective coordinate frame of the target map that is determined based on the first pair of source and target images with the respective position of the real-world element within the respective coordinate frame of the target map that is determined based on each of the one or more additional pairs of source and target images in order to produce an aggregated position of the real-world element within the respective coordinate frame of the target map.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 7 is a simplified block diagram that illustrates some structural components that may be included in an example computing platform.

DETAILED DESCRIPTION

Figure 1A:
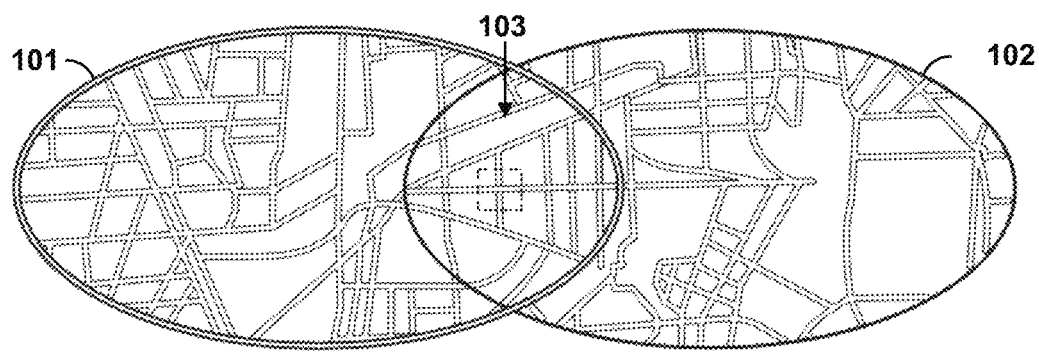
FIG. 1A is a diagram that illustrates a circumstance where a first map has an overlapping coverage area with a second map.

As noted above, maps play an important role in various areas of technology. For instance, on-board computing systems of vehicles (e.g., autonomy systems and/or advanced driver assistance systems) may use maps for various purposes. As one specific example, an on-board computing system of a vehicle may be configured to localize the vehicle within a map and then use data encoded within the map to help establish a baseline understanding of the real-world environment in which the vehicle is located, such as road-network data that provides information about the road network within the real-world environment in which the vehicle is located, geometric data that provides information about the physical geometry of the real-world environment in which the vehicle is located, and/or semantic data that provides information about the semantic elements within the real-world environment in which the vehicle is located (e.g., lanes, traffic lights, traffic signs, crosswalks, etc.), which can then be utilized by the on-board computing system when performing operations such as perception of other agents in the real-world environment, prediction of the future behavior of agents in the real-world environment, and/or planning of the vehicle's future behavior within the real-world environment. In this way, the map provides the on-board computing system of the vehicle with precomputed baseline information about the vehicle's surrounding environment that generally has a high level of accuracy, which may reduce the need for the on-board computing system to derive this baseline information in real time and thereby reduce the computational burden of the vehicle's on-board computing system while also enhancing the reliability of the operations such as perception, prediction, and planning.

Transportation-matching platforms (e.g., platforms configured to match individuals interested in obtaining transportation with vehicles capable of providing such transportation) may use maps to perform various different operations, including but not limited to matching individuals with available vehicles within the given area, generating routes for vehicles to follow when picking up and/or transporting individuals within the given area, providing estimates of pickup and drop-off times within the given area, choosing locations for performing pickups and drop-offs within the given area, and/or pre-positioning vehicles within the given area in anticipation of responding to transportation requests, among other possibilities.

It should be understood that maps may be used in various other areas of technology as well.

In order to be used for the types of applications described above, the information encoded into the map generally needs to represent the location of real-world elements with some threshold level of accuracy. For instance, a map that is to be used by on-board computing systems of vehicles to help inform operations such as perception, prediction, and planning generally needs to represent the location of real-world elements with an accuracy of a few centimeters. Likewise, a map that is to be used by a transportation-matching platform may need to represent the location of real-world elements with a similar level of accuracy, at least for certain of the operations that are to be performed by the transportation-matching platform.

However, the task of creating a map that represents the location of real-world elements with a high level of accuracy (which may sometimes be referred to as a "high-resolution map") typically involves a complex, multi-phase process that tends to be time consuming and costly. One representative example of a multi-phase process that may be utilized to create such a map will now be described for purposes of illustration, but it should be understood that the process for creating a map may take various other forms as well—including but not limited to the possibility that the process may include more or less phases than what is specifically described below and/or that the map may include additional types of map data beyond what is specifically described below.

In this representative example, the process for creating a map may begin with a first phase during which sensor-equipped vehicles driving within a particular geographic region (e.g., a locality such as a city or town) capture sensor data that provides information about the portion of the geographic region being perceived by the sensor-equipped vehicles, such as image data, Light Detection and Ranging (LiDAR) data, Global Positioning System (GPS) data, and/or Inertial Measurement Unit (IMU) data, among other possibilities.

After this sensor data has been collected, the process may then turn to a second phase during which the collected sensor data is fused together and processed in order to generate geometric data for the map, which may involve the use of a simultaneous localization and mapping (SLAM) technique as well as various other data processing techniques, examples of which may include segmentation, projection, and filtering. This geometric data may then serve to define the coordinate frame for the map, and any other data encoded into the map may be represented in terms of this coordinate frame.

After the geometric data for the map has been generated, the process may turn to a third phase during which the processed sensor data is analyzed using computer-vision and/or machine-learning techniques in order to automatically generate an initial set of semantic data for the map. This function of automatically generating the initial set of semantic data for the map may involve (i) identifying semantic elements that appear in the processed sensor data (e.g., lanes, traffic lights, traffic signs, crosswalks, etc.) and then (ii) generating an initial set of data objects that virtually represent the identified semantic elements within the map. In this respect, the respective data object that is generated for each identified semantic element may include at least a determined classification of the semantic element and a determined position of the semantic element within the map's coordinate frame, which may comprise a single coordinate that represents semantic element's position in terms of a single reference point (e.g., a coordinate associated with the semantic element's centerpoint) and/or a set of coordinates that represent the semantic element's position in terms of a multi-dimensional shape such as a bounding box. Additionally, the respective data object that is generated for each identified semantic element may include other information about the semantic element as well. For example, a data object for a traffic light may additionally include information about the direction that the traffic light points (e.g., a determined orientation of the traffic light within the map's coordinate frame), the different faces of the traffic light, and/or the lanes that are associated with the traffic light, among other possibilities. As another example, a data object for a lane may additionally include information about speed limits, turn restrictions, and/or observed prior driving behavior within the lane, among other possibilities. Many other examples are possible as well.

However, in practice, the initial set of semantic data that is automatically generated in this manner typically does not have a sufficient level of accuracy to allow such semantic data to be used in a map, particularly as it relates to the determined position of the semantic elements within the map's coordinate frame. As such, after the initial set of semantic data has been automatically generated, the process turns to a fourth phase during which human curators review and update the initial set of semantic data in order to ensure that it has a sufficient level of accuracy (e.g., position information that is accurate at a centimeter-level). For instance, the human curators may use tools that present visualizations in which initial set of semantic data is overlaid onto the collected sensor data in the form of labels (e.g., bounding boxes) that represent the automatically-generated information for the identified semantic elements, such as the determined classification and the determined position information for each identified semantic element, and the human curators may then use these tools to (i) update the automatically-generated information for the identified semantic objects (e.g., by modifying the determined classifications and/or refining the determined position information), (ii) add new information for additional semantic elements that were not previously identified, and/or (iii) remove automatically-generated information for aspects of the geographic region that were erroneously identified as semantic elements.

In practice, this human curation task for the map's semantic data tends to be very labor intensive, as it typically requires humans to review and curate the automatically-generated semantic data across a sizeable number of different frames of sensor data that have been collected by the fleet of sensor-equipped vehicles. For instance, a curation tool may present the automatically-generated semantic data to human curators in the form of labels (e.g., bounding boxes) that have been overlaid on image data collected by the fleet of sensor-equipped vehicles, and this image data typically has a capture rate of at least 60 frames per second, which means that the human curators may need to review and curate semantic data in up to 60 discrete images for every second of a sensor-equipped vehicle's collection run. This equates to 3,500 images for every minute of sensor data that is collected for the geographic region and 216,000 images for every hour of sensor data that is collected for the geographic region, which serves to illustrate why the human curation tends to be so labor intensive. Thus, this human-curation phase of the process for creating a map—which is typically necessary in order to achieve the requisite level of precision and accuracy for semantic data—tends to significantly drive up the time and cost that goes into creating a new map for a geographic region.

Once this human curation task has been completed, an updated set of semantic data may then be generated for the map. In turn, the process may proceed to a fifth and final phase during which the generated geometric data and the generated semantic data may be combined together into the final set of map data that defines the map for the geographic region.

While the process for creating a map having a high level of accuracy tends to be time consuming and costly, to date, the need for these types of maps has been relatively limited. However, as technological advancements continue to be made in areas such as autonomous driving and transportation matching, there will be an increasing need to create maps having a high level of accuracy for various geographic regions throughout the world. For example, each time a decision is made to deploy a fleet of vehicles equipped with autonomous driving capability into a new geographic region (e.g., a new metropolitan area), this may give rise to a need for a new map covering that geographic region. As another example, each time a decision is made to roll out a new transportation-matching feature that relies on a map having a high level accuracy within a geographic region, this may give rise to a need for a new map covering that geographic region. In this respect, the process described above will theoretically need to be repeated each time that a new map needs to be created, which is problematic due to the time and cost that is typically required to carry out that process.

One possible way to decrease the time and cost required to create a new map for a geographic region would be to determine whether any map data has previously been created for that geographic region, and if so, leverage that previously-created map data during the process of creating the new map for the geographic region. There are a few different circumstances where this may be feasible.

For instance, as one possibility, a circumstance may arise that requires a new map to be created for a geographic region that has some overlap with another geographic region for which a map was already previously created. As a specific example to illustrate, after a map has been created for San Francisco and its surrounding localities to facilitate operation of a fleet of vehicles equipped with autonomous driving capability in that geographic region, a decision could be made to begin operating a new fleet of vehicles equipped with autonomous driving capability in Palo Alto and its surrounding localities, which may require creation of a new map that will have an overlapping coverage area with the previously-created map due to the overlap in surrounding localities between San Francisco and Palo Alto.

As another possibility, a circumstance may arise that requires multiple different maps to be created for the same geographic region. As a specific example to illustrate, after a first organization that owns and/or operates a fleet of vehicles equipped with autonomous driving capability has created a map for a geographic region that is designed for use by the first organization's fleet, a second organization may decide to begin operating its own fleet of vehicles equipped with autonomous driving capability in that same geographic region, which may require the second organization to create a new map for the geographic region that is designed for use by the second organization's fleet.

It is possible that other circumstances may also arise where a new map needs to be created for a geographic region and there is some availability of previously-created map data for that geographic region.

When such a circumstance arises, it would be beneficial to use the previously-created map data that is available for a geographic region during the process of creating a new map for the geographic region, because this may reduce the time and cost required to create the new map for the geographic region. For example, if it is determined that semantic data has already previously been created for at least a portion of a geographic region, then encoding this previously-created semantic data into a new map for the geographic region would avoid the need to recreate such semantic data a second time, which advantageously reduces both the processing that is needed to automatically generate the semantic data for the new map and the time-consuming, costly labor that is needed to perform human curation of the semantic data for the new map. As another example, if it is determined that geometric data has already previously been created for at least a portion of a geographic region, then encoding aspects of this previously-created geometric data into a new map for the geographic region would avoid the need to recreate such geometric data a second time, which advantageously reduces the processing that is needed to generate the geometric data for the new map.

However, in practice, it is not possible to simply copy map data from a previously-created map into a new map, because each map typically has its own respective coordinate frame that is defined by the map's geometric data. Thus, before map data from a previously-created map can be encoded within a new map, the position information associated with the map data (e.g., the coordinates of the data objects to be encoded) needs to be translated from the previously-created map's coordinate frame to the new map's coordinate frame. In this respect, some techniques do currently exist for performing a translation of position information from a first map's coordinate frame to a second map's coordinate frame. For instance, one such technique may involve (i) translating position information from the first map's coordinate frame to a global coordinate frame, such as an Earth-centered Earth-fixed (ECEF) coordinate frame or a World Geodetic System (WGS) coordinate frame (e.g., WGS 84), and then (ii) translating the position information from that global coordinate frame to the second map's coordinate frame. However, existing techniques such as these are typically only capable of translating position information between different coordinate frames with an accuracy level of approximately 1-3 meters, which may not be acceptable for the types of applications discussed above.

This problem with existing techniques for translating position information between different map coordinate frames is illustrated in FIGS. 1A-1D. As shown in FIG. 1A, there is a first map 101 that has previously been created for a first geographic region and a second map 102 that is currently in the process of being created for a second geographic region that has an overlapping coverage area 103 with map 101. In line with the discussion above, such a circumstance could arise when a first fleet of vehicles equipped with autonomous driving capability has already been deployed in the first geographic region, which may comprise a first metropolitan area, and a decision is then made to deploy a new fleet of vehicles equipped with autonomous driving capability in the second geographic region, which may comprise a second metropolitan area that includes some of the same localities as the first metropolitan area.

Given the overlap between the coverage areas of maps 101 and 102, this circumstance presents an opportunity to reuse map data from map 101 during the creation of map 102 in order to reduce the time and cost that goes into creating map 102. For example, to the extent that map 101 is encoded with data objects for semantic elements of interest that fall within overlapping coverage area 103, this presents an opportunity to transfer these data objects to map 102 and thereby eliminate the need to recreate such data objects a second time, which would reduce both the processing that is needed to automatically generate the data objects and the time-consuming, costly labor that is needed to perform human curation for the data objects. The semantic elements for which data objects have been encoded into map 101 could take any of various forms, examples of which may include lanes, traffic lights, road signs, and crosswalks, among various other possibilities.

Figure 1B:
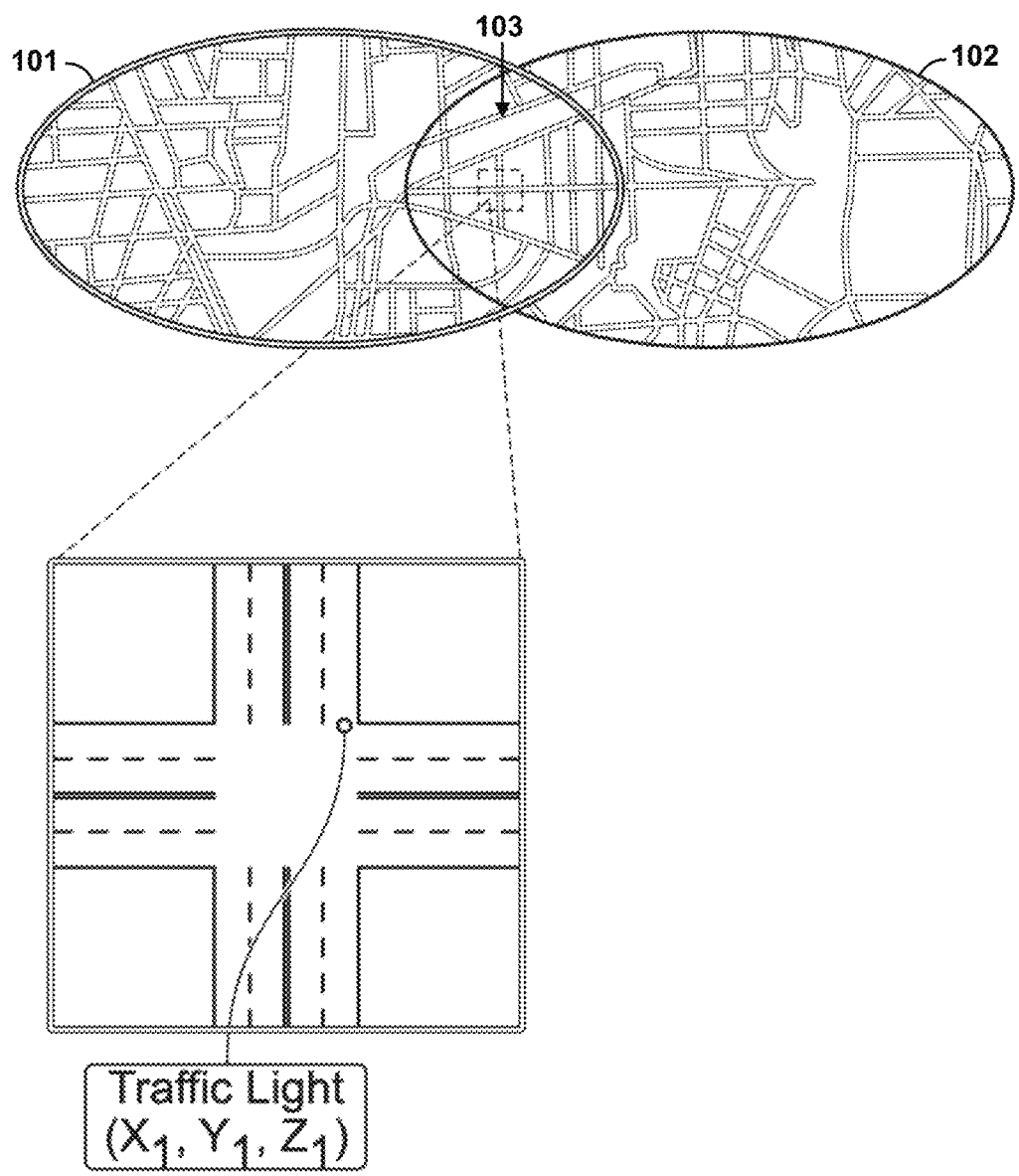
FIG. 1B is a diagram that illustrates an example data object for a traffic light that has been encoded into the first map of FIG. 1A.

To illustrate with a specific example, FIG. 1B shows that a data object has been encoded into map 101 for a given traffic light at an intersection that falls within overlapping coverage area 103. As shown, the traffic light is positioned to control the right lane of the northbound roadway in this intersection, and the data object for the traffic light specifies the determined position of the traffic light with the coordinate frame of map 101 (which has been validated by a human curator) in terms of a single representative coordinate, which is denoted as $(X_1, Y_1, Z_1)$.

Figure 1C:
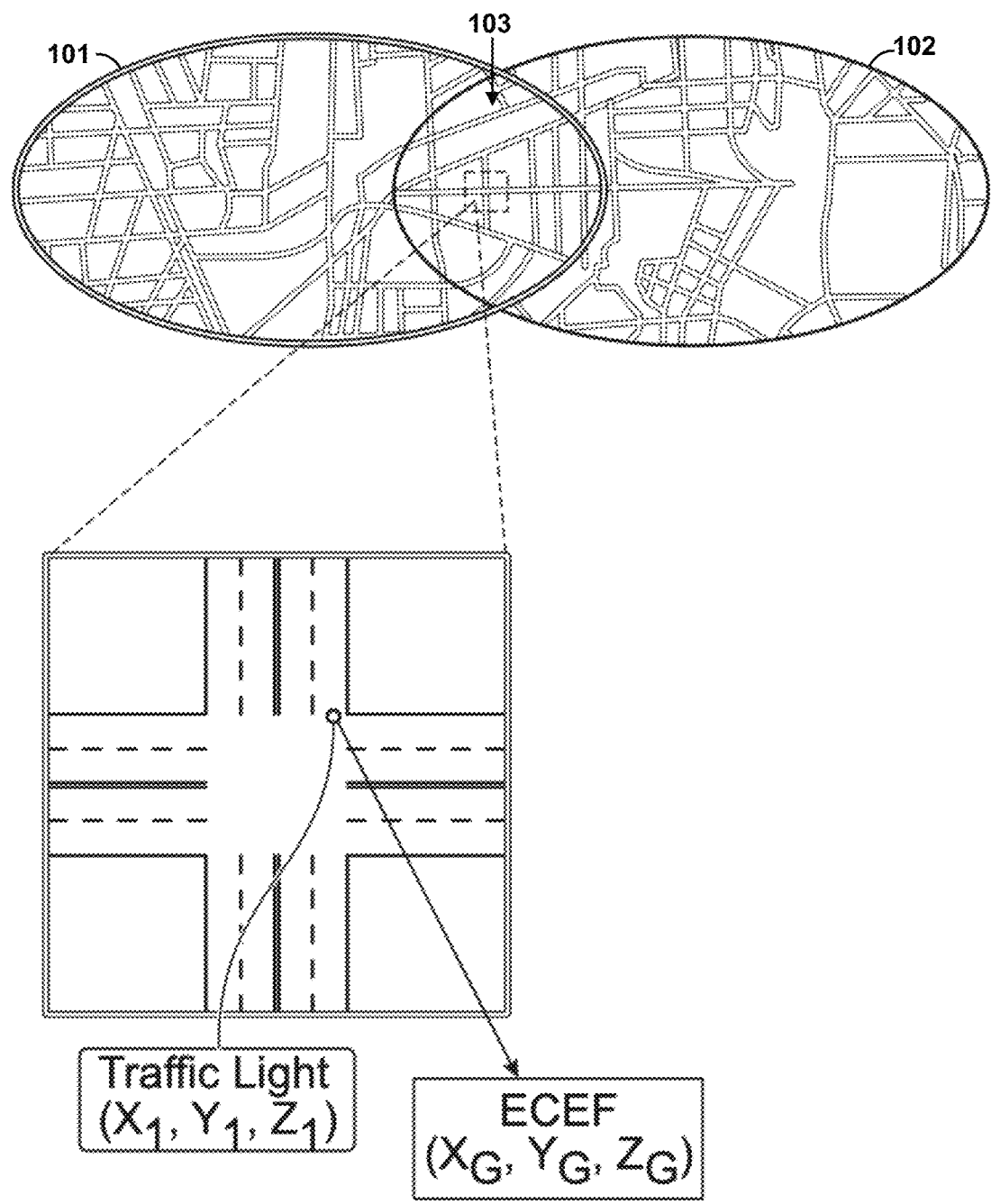
FIG. 1C is a diagram that illustrates a translation of the position of the traffic light from a coordinate system of the first map of FIG. 1A to a global coordinate system.

As noted above, in order to transfer the data object for the traffic light from map 101 to map 102, the determined position of the traffic light needs to be translated from the coordinate frame of map 101 to the coordinate frame of map 102. The first step in carrying out this translation according to existing techniques would involve translating the determined position of the traffic light from the coordinate frame of the first map to a global coordinate frame such as ECEF or WGS 84, such that the determined coordinate for the traffic light is represented according to this global reference frame. One specific example of this first translation step is illustrated in FIG. 1C, which shows that the determined coordinate for the traffic light has been translated to an ECEF coordinate frame and is now denoted as $(X_G, Y_G, Z_G)$.

Figure 1D:
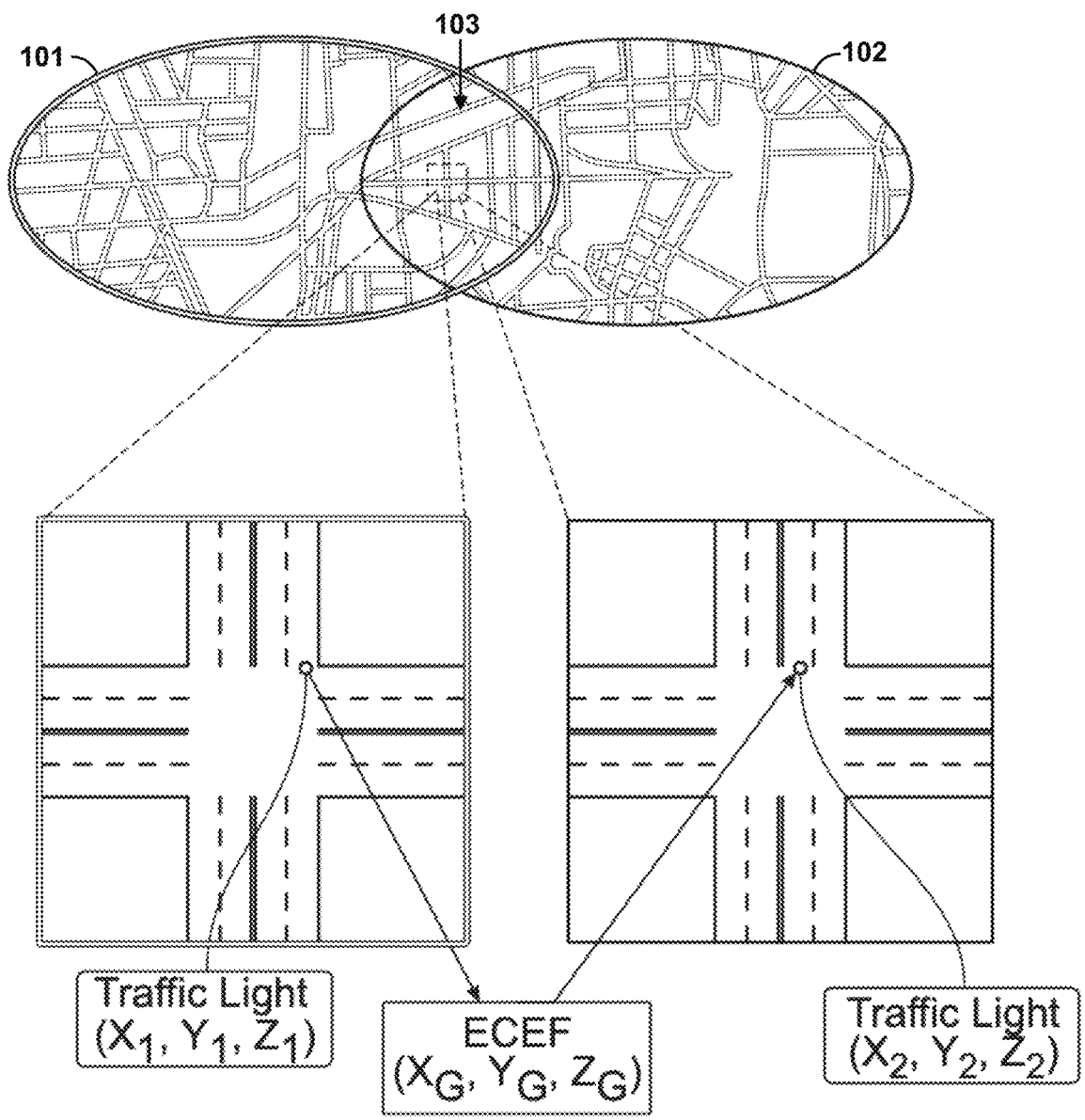
FIG. 1D is a diagram that illustrates a translation of the position of the traffic light from the global coordinate system to a coordinate system of the second map of FIG. 1A.

In turn, the second step in carrying out this translation according to existing techniques would involve translating the determined position of the traffic light from the global coordinate frame to the coordinate frame of map 102. One specific example of this second translation step is illustrated in FIG. 1D, which shows that the determined coordinate for the traffic light has been translated from the ECEF coordinate frame to the coordinate frame of map 102 and is now denoted as $(X_2, Y_2, Z_2)$. However, as shown in FIG. 1D, the process of translating the traffic light's determined position from the coordinate frame of map 101 to the coordinate frame of map 102 via the ECEF coordinate frame has introduced an error of approximately 1-3 meters in the determined position that could result in the data object for the traffic light being positioned in an entirely different lane within map 102 (e.g., the left lane as opposed to the right lane), which may not be an acceptable level of accuracy for certain types of applications.

For instance, if map 102 were being created for use by on-board computing systems of vehicles, a given vehicle's on-board computing system may end up using the information encoded into map 102 for the traffic light to locate the traffic light in its surrounding environment, determine whether the traffic light applies to the lane in which the given vehicle is traveling, determine the current state of the traffic light, and then plan the future behavior of the given vehicle based on those determinations. However, because the traffic light has not been accurately positioned within the coordinate frame of map 102, the given vehicle's on-board computing system may not be to confidently locate the traffic light as it approaches the intersection, or worse, the given vehicle's on-board computing system may confuse the traffic light (which is designed to control the right lane) with an entirely different traffic light that is designed to control the left lane—which could lead to flawed decision making by the on-board computing system as the given vehicle approaches the intersection.

Similarly, if map 102 were being created for use by a transportation-matching platform, the inaccurate positioning of real-world elements within the coordinate frame of map 102 may degrade the accuracy of certain operations performed by the transportation-matching platform based on map 102. For example, a transportation-matching platform could be configured to use the positioning of certain types of real-world elements within map 102, such as traffic signs, bus stops, red zones, fire hydrants, or the like, to inform its selection of pickup and/or drop-off locations (e.g., by avoiding pickup and/or drop-off locations that are immediately in front of such real-world elements elements). However, if such real-world elements have not been accurately positioned within the coordinate frame of map 102, the transportation-matching platform may end up selecting undesirable pickup and/or drop-off locations that could lead to problems for drivers and/or passengers. Along similar lines, the inaccurate positioning of real-world elements within map 102 could also lead to less optimal matches of individuals with available vehicles, less optimal routes for vehicles to follow when picking up and/or transporting individuals, and/or less accurate estimates of pickup and/or drop-off times, among other possibilities.

In view of these problems with existing techniques for translating position information between different map coordinate frames, efforts are currently being made to develop advanced techniques that may be capable of translating positions between different map coordinate frames with a higher level of accuracy (e.g., centimeter-level accuracy). In general, these advanced techniques leverage three-dimensional (3D) point cloud data and SLAM technology in order to carry out highly accurate translations between different map coordinate frames. However, these advanced techniques tend to require the availability of high-fidelity sensor data (e.g., LiDAR data) and also tend to be computationally demanding, which increases both the compute resources that are required to carry out the translation and the time that it takes to perform the translations. Thus, there remains a need for a technique that is capable of accurately and efficiently translating positions of elements between overlapping maps having different coordinate frames, so that previously-created map data can be transferred between the overlapping maps.

To address this need, disclosed herein is a new technique for translating positions of elements between overlapping maps having different coordinate frames that leverages the geometric relationship between respective sets of image data associated with the different maps, which may enable previously-created map data (e.g., semantic data and/or certain aspects of geometric data) to be transferred between the overlapping maps in a more accurate manner. For example, if a circumstance arises that requires a new map to be created for a geographic region has some overlap with another geographic region for which a map was already previously created (e.g., maps for neighboring metropolitan areas), the disclosed technique may be used to accurately transfer data objects for real-world elements falling in the overlapping coverage area from the previously-created map to the new map. As another example, if a circumstance arises that requires the creation of multiple different maps for the same geographic region (e.g., maps created by two different operators of vehicles equipped with autonomous driving capability and/or two different operators of transportation-matching platforms), the disclosed technique may be used to accurately transfer data objects for real-world elements between the different maps for the geographic region.

In this way, the disclosed technique may be used to avoid having to recreate the same map data multiple different times, which may advantageously reduce both the processing that is required to create a new map and also the time-consuming, costly human curation is typically required to create a new map. Further, the disclosed technique provides a way to accurately translate positions of elements between overlapping maps having different coordinate frames using image data and corresponding data indicating the position and orientation ("pose") of the cameras that captured the image data (which may be referred to herein as the "capture pose" of such image data), which provides several advantages over other advanced techniques for accurately translating map data between different map coordinate frames—including that (i) the disclosed technique provides a way to accurately translate positions of elements between overlapping maps having different coordinate frames that does not require high-fidelity, 3D sensor data such as LiDAR data, which typically has more limited availability and is more expensive to collect, and (ii) the disclosed technique is less computationally demanding (and thus faster) than other advanced techniques that are currently being developed for accurately translating map data between different map coordinate frames.

Figure 2A:
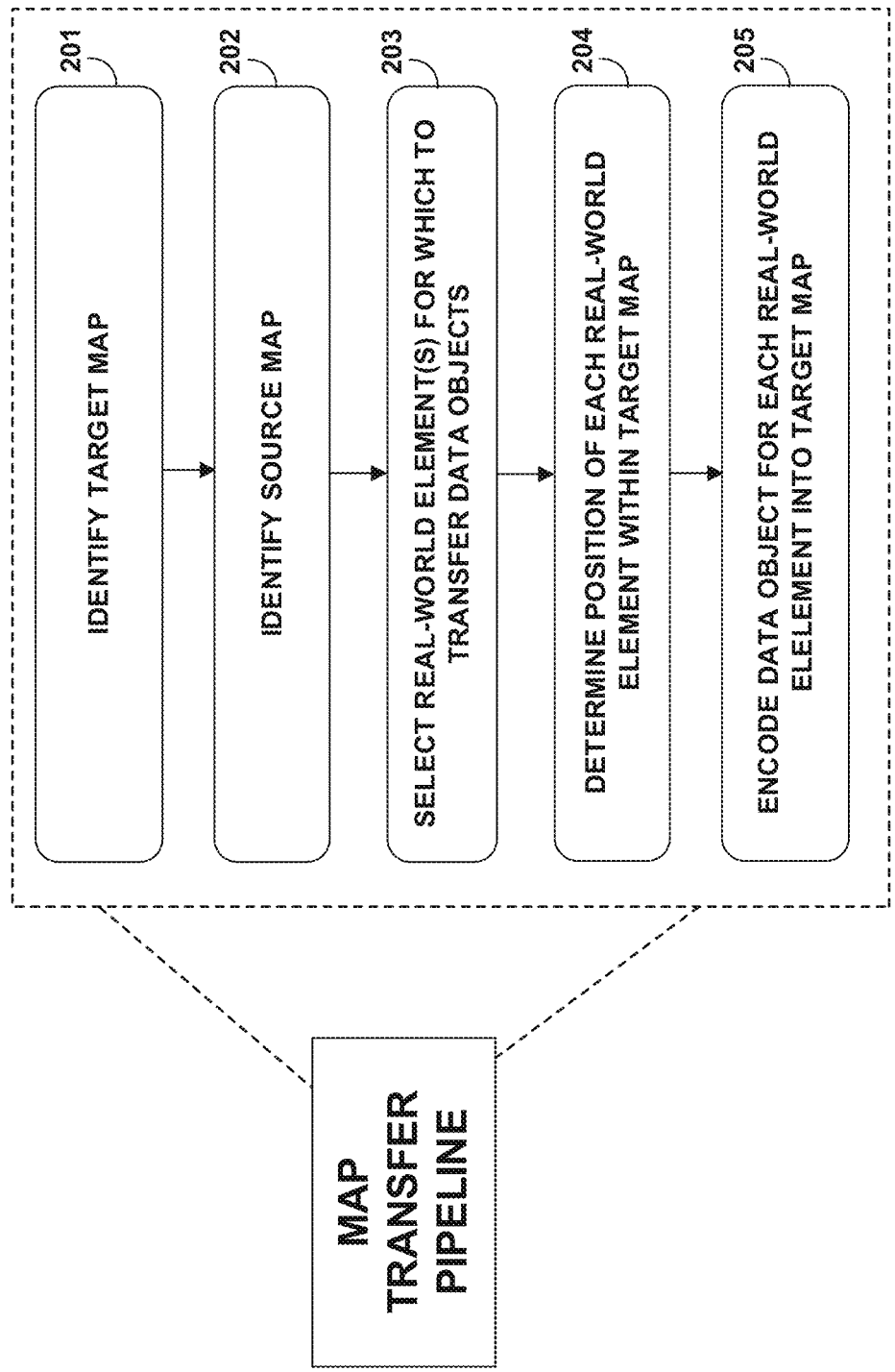
FIG. 2A is a diagram that illustrates one possible example of a pipeline for transferring data objects between maps having different coordinate frames that incorporates the disclosed technique for positioning real-world elements within a map.

One example of a pipeline for transferring data objects between maps having different coordinate frames that incorporates the disclosed technique will now be described with reference to FIGS. 2A-2B. As shown in FIG. 2A, the example pipeline may begin at block 201 by identifying a target map that could potentially benefit from receiving a transfer of map data that has been previously created and encoded within another map. In this respect, the manner in which the example pipeline identifies the target map may take various forms.

For instance, as one possibility, the example pipeline may detect that a new map for a geographic region that has been created (or is in the process of being created) but has not yet been encoded with certain forms of map data (e.g., semantic data and/or certain forms of geometric data), and based on this detection, the example pipeline may then identify the new map as a target map for transferring map data. As another possibility, the example pipeline may receive a request to update a previously-created map for a geographic region that does not include certain forms of map data (e.g., such as semantic data and/or certain forms of geometric data) due to limitations in the mapping pipeline used to create the previously-created map, and based on receiving this request, the example pipeline may then identify the previously-created map as a target map for transferring map data. As yet another possibility, the example pipeline may be configured to perform an evaluation of previously-created maps that cover overlapping geographic regions in order to identify differences in the map data encoded within such maps (e.g., differences resulting from updates being made to the map data for one map but not another), and based on this evaluation, the example pipeline may then identify whichever of the maps has missing map data as a target map for transferring map data. The function of identifying a target map for transferring map data may take other forms as well.

Turning to block 202, the example pipeline may identify at least one source map that can be used as a basis for transferring previously-created map data to the target map. In this respect, at a high level, the function of identifying the at least one source map for transferring map data may involve identifying at least one previously-created map that (i) has an overlapping coverage area with the target map and (ii) is encoded with data objects that virtually represent real-world elements of interest located within the overlapping coverage area (e.g., semantic elements and/or certain geometric elements of interest). The manner in which the example pipeline determines whether a previously-created map meets this criteria may take various forms.

For instance, as one possibility, the example pipeline may first determine whether a previously-created map has an overlapping coverage area with the target map, which may involve (i) obtaining data that indicates a geographic coverage area of the target map, (ii) obtaining data that indicates a geographic coverage area of the previously-created map, and then (iii) using the obtained data as a basis for determining whether there is any overlap between the target map's geographic coverage area and the previously-created map's geographic coverage area. In this respect, in some implementations, it may be the case that data indicating the geographic coverage areas of the maps may already exist in a form that allows for direct comparison between the geographic coverage areas, in which case this preexisting data may be obtained and used to determine whether there is any overlap between the target map's geographic coverage area and the previously-created map's geographic coverage area. For example, in practice, each map may have associated metadata that specifies the map's geographic coverage area in relation to a common global coordinate frame (e.g., ECEF, WGS 84, etc.), in which case the example pipeline may obtain and use this metadata to determine whether there is any overlap between the target map's geographic coverage area and the previously-created map's geographic coverage area.

However, in other implementations, the function of obtaining the data indicating the geographic coverage areas of the maps may require some level of data processing before such data can be used to determine whether there is any overlap between the target map's geographic coverage area and the previously-created map's geographic coverage area. For example, in practice, the function of obtaining data indicating a geographic coverage area of a map may involve (i) using the map's geometric data to extract data that defines the map's coverage area in terms of the map's local coordinate frame, and then (ii) translating the extracted data from the map's local coordinate frame to a common global coordinate frame so as to enable comparison with coverage-area data for other maps, among other possible data processing operations.

The example pipeline may determine whether a previously-created map has an overlapping coverage area with the target map in other manners as well, including but not limited to the possibility that the example pipeline could potentially utilize a matching algorithm to evaluate whether there is any geometric similarity between the previously-created map's geometric data and the target map's geometric data.

If the example pipeline determines that a previously-created map has an overlapping coverage area with the target map, the example pipeline may also function to derive certain data that characterizes the overlap between the previously-created map and the target map, which may then be used by the example pipeline when deciding whether to identify the previously-created map as a source map for transferring map data. This derived data that characterizes the overlap between the previously-created map and the target map may take various forms, examples of which may include a set of geographic coordinates that defines the overlapping area (which may be represented in terms of the previously-created map's coordinate frame and/or a global reference frame), a metric that quantifies the extent of overlap between the previously-created map and the target map, and/or a metric that quantifies the statistical confidence that the previously-created map and the target map have an overlapping coverage area, among other possibilities.

After determining that a previously-created map has an overlapping coverage area with the target map, the example pipeline may next determine whether the previously-created map is encoded with data objects for real-world elements of interest located within the overlapping coverage area, which may involve (i) defining the overlapping coverage area within the previously-created map's coordinate frame and then (ii) determining whether the previously-created map is encoded with any data objects for real-world elements of interest that have positions falling within the defined overlapping area. For example, if the real-world elements of interest comprise semantic elements such as lanes, traffic lights, traffic signs, crosswalks, etc., the example pipeline may determine whether the previously-created map is encoded with any data objects for semantic elements that have positions falling within the defined overlapping area. As another example, if the real-world elements of interest comprise certain types of geometric elements such as ground-map elements, the example pipeline may determine whether the previously-created map is encoded with any data objects for such geometric elements that have positions falling within the defined overlapping area. Other examples are possible as well.

The example pipeline may determine whether the previously-created map is encoded with data objects for real-world elements of interest located within the overlapping coverage area in other manners as well.

If the example pipeline determines that a previously-created map is encoded with data objects for real-world elements of interest located within the overlapping coverage area, the example pipeline may also function to derive certain data that characterizes such data objects. This derived data that characterizes the data objects for real-world elements of interest located within the overlapping coverage area may take various forms, examples of which may include data identifying the specific data objects for real-world elements of interest that are located within the overlapping coverage area, data indicating the extent of data objects for real-world elements of interest that are located within the overlapping coverage area, and/or data specifying the types of real-world elements for which data objects are located within the overlapping coverage area (e.g., the different classes of semantic elements for which data objects are located within the overlapping coverage area), among other possibilities.

The example pipeline may be configured to carry out the foregoing evaluation for a plurality of different previously-created maps, which may result in the example pipeline identifying one or more previously-created maps that meet the criteria of (i) having an overlapping coverage area with the target map and (ii) being encoded with data objects for real-world elements of interest located within the overlapping coverage area. In this respect, to the extent that the example pipeline identifies only one single previously-created map that meets the foregoing criteria, the example pipeline may then designate this one previously-created map as a source map for transferring map data to the target map—although it should be understood that example pipeline may also be configured to perform a validation of this previously-created map before designating it as a source map for transferring map data to the target map. For example, the example pipeline may evaluate data characterizing the previously-created map's overlap with the target map (e.g., metrics indicating the extent of the overlap and/or the statistical confidence in the overlap) and/or data characterizing the previously-created map's data objects that are located within the overlapping coverage area with the target map (e.g., data indicating the extent and/or type of data objects that are located within the overlapping coverage area) in order to validate that the previously-created map is a sufficient candidate to serve as a source map for transferring map data to the target map.

On the other hand, to the extent that the example pipeline identifies multiple previously-created maps that meet the foregoing criteria, the example pipeline may then perform a further evaluation of these previously-created maps in order to determine which one or more of these previously-created map to designate as a source map for transferring map data to the target map. In this respect, the example pipeline's further evaluation of these previously-created maps may involve a comparison between the previously-created maps that is based on data characterizing each previously-created map's overlap with the target map (e.g., metrics indicating the extent of the overlap and/or the statistical confidence in the overlap) and/or data characterizing each previously-created map's data objects that are located within the overlapping coverage area with the target map (e.g., data indicating the extent and/or type of data objects that are located within the overlapping coverage area), among other possibilities. Based on this comparison, the example pipeline may then identify at least one of the previously-created maps as a source map for transferring map data to the target map.

For purposes of explanation, the ensuing functions of the example pipeline illustrated in FIGS. 2A-2B will be described with reference to a single source map, but it will be appreciated that the example pipeline may be operable to carry out the ensuing functions for each of multiple different source maps, which may advantageously allow the example pipeline to encode the target map with an even greater extent of previously-created map data. In this respect, the different source maps could comprise source maps that overlap different areas of the target map and/or source maps that are encoded with data objects for different types of real-world elements of interest, among other possibilities.

After the target and source maps have been identified, at block 203, the example pipeline may select one or more real-world elements for which to transfer a data object from the source map to the target map. This selection may be based on various factors. For instance, at a minimum, the example pipeline's decision of whether to select a real-world element for which to transfer a data object from the source map to the target map may be based on (i) the type of real-world element (e.g., whether the real-world element is of a type that has been designated as being of interest for purposes of the transfer) and (ii) the specified position of the real-world element within the source map (e.g., whether the real-world element has an specified position that falls within the overlapping area). In this respect, any real-world element of a type deemed to be of interest for the transfer (e.g., a semantic element or a certain type of geometric element) that has a specified position within the source map falling inside the overlapping coverage area may be a candidate for transfer of its data object from the source map to the target map.

Further, to the extent available, the example pipeline's decision of whether to select a real-world element for which to transfer a data object from the source map to the target map may additionally be based on a confidence level associated with the source map's data object for the real-world element that indicates a confidence in the position information for the real-world element that is specified by the data object (which could be assigned during creation of the source map by a mapping pipeline or the like). For instance, if the source map's data object for a real-world element has an associated confidence level that satisfies a confidence-level threshold, then that real-world element may be a candidate for transfer of its data object from the source map to the target map. On the other hand, if the source map's data object for a real-world element has an associated confidence level that does not satisfy a confidence-level threshold, then that real-world element may be eliminated as a candidate.

Further yet, the example pipeline's decision of whether to select a real-world element for which to transfer a data object from the source map to the target map may additionally be based on an evaluation of whether the target map already includes a data object for the real-world element.

The example pipeline's selection of the one or more real-world elements for which to transfer a data object from the source map to the target map may be based on other factors and/or take other forms as well.

Turning to block 204, the example pipeline may next determine where to position each selected real-world element within the target map by evaluating certain types of sensor data used to create the source and target maps, such as image data and corresponding capture pose data for the image data, in order to determine a geometric relationship between certain of the image data used to create the source map (which may be referred to herein as "source image data") and corresponding image data used to create to the target map (which may be referred to herein as "target image data"). In this respect, the image data that is used to perform this evaluation may comprise camera images that have been captured by any of various different types of cameras, examples of which may include monocular cameras, stereo cameras, and/or 360° camera arrays, among other possible camera types. Likewise, the data indicating the images' corresponding capture poses may take various forms, examples of which may comprise GPS data and/or IMU data, among other possibilities. One possible implementation of such an evaluation that may be carried out by the example pipeline in order to determine where to position a selected real-world element within a target map will now be described with reference to FIG. 2B.

Figure 2B:
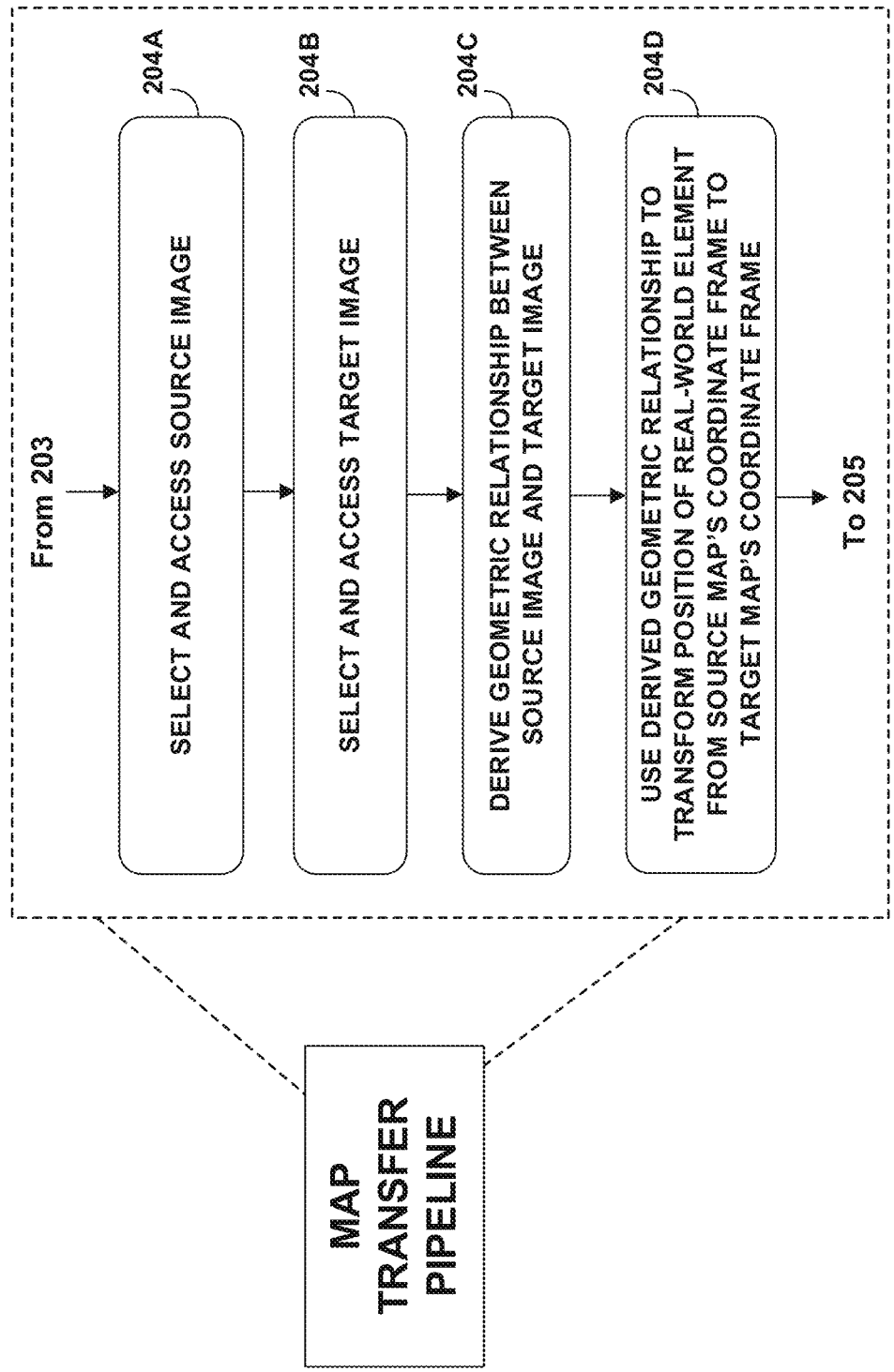
FIG. 2B is a diagram that illustrates one possible example of how the example pipeline of FIG. 2A may derive the geometric relationship between image data used to create a source map and corresponding image data used to create a target map and then use that derived geometric relationship to determine where to position a real-world element within the target map.

As shown in FIG. 2B, at block 204A, the example pipeline may begin by selecting and accessing a source image that was used to create the data object for the selected real-world element within the source map, which may generally take the form of a source image that (i) depicts a scene in which the selected real-world element appears and (ii) has been assigned a label that demarcates the position of the selected real-world element within the depicted scene. This function of selecting and accessing the source image may take various forms.

As one possibility, the example pipeline may begin by accessing a repository of the camera images that were captured by sensor-equipped vehicles and then assigned labels during the process of creating the source map. Within this repository, each camera image may be associated with various information that may be used by the example pipeline to select and access the source image. For instance, each camera image in the repository may have an associated value that indicates the pose of the capturing camera at the time that the camera image was captured, which as noted above may be referred to herein as the "capture pose" of the camera image. In line with the discussion above, this capture pose of a camera image may be based on measurements collected by GPS and/or IMU units that were co-located with the camera image's capturing camera on the sensor-equipped vehicle, in which case the capture pose may be represented in terms of a global reference frame (e.g., WGS 84). However, the capture pose of a camera image may take other forms as well—including but not limited to the possibility that the capture pose of a camera image may be represented in terms of the source map's coordinate frame.

The example pipeline could then use these capture poses of the camera images within the repository to select the source image, which may involve (i) translating the determined position of the selected real-world element from the source map's coordinate frame to the global coordinate frame according to which the capture poses are represented, (ii) comparing the translated position of the selected real-world element to the capture poses of the camera images within the repository, and then (iii) based on this comparison, identifying one or more camera images having a capture position that is sufficiently close to the translated position of the selected real-world element and a capture orientation that is sufficiently in the direction of the translated position of the selected real-world element (e.g., a capture orientation that falls within a given range of yaw values that is defined based on the relative positioning between the capture pose and real-world element as well as the field of view of the capturing camera) such that the selected real-world element would be expected to appear within the field of view of the capturing camera. In turn, the example pipeline may select the source image from the identified one or more camera images based on various factors. For example, if multiple camera images have been identified, the example pipeline may begin by selecting the identified camera image having a capture position that is the shortest distance from the translated position of the selected real-world element, the identified camera image having a capture orientation that provides the best angle to the selected real-world element, or the identified camera image having the capture pose that provides the most optimal combination of distance and angle to the selected real-world element (e.g., as defined by a multivariate scoring algorithm or the like)—although as described below, the example pipeline may ultimately function to evaluate each of the identified camera images in the manner described herein.

It should be understood that the example pipeline may function to select and access the source image in other manners as well.

Further, it should be understood that the label for the selected real-world element that is assigned to the source image may take various forms. For instance, as one possibility, the label may take the form of a two-dimensional (2D) bounding box that demarcates the position of the selected real-world element within the depicted scene, and this 2D bounding box may be defined in terms of a set of pixel coordinates that specify the positions of the 2D bounding box's vertices within the source image. However, the label for the selected real-world element could take other forms as well.

Figure 3A:
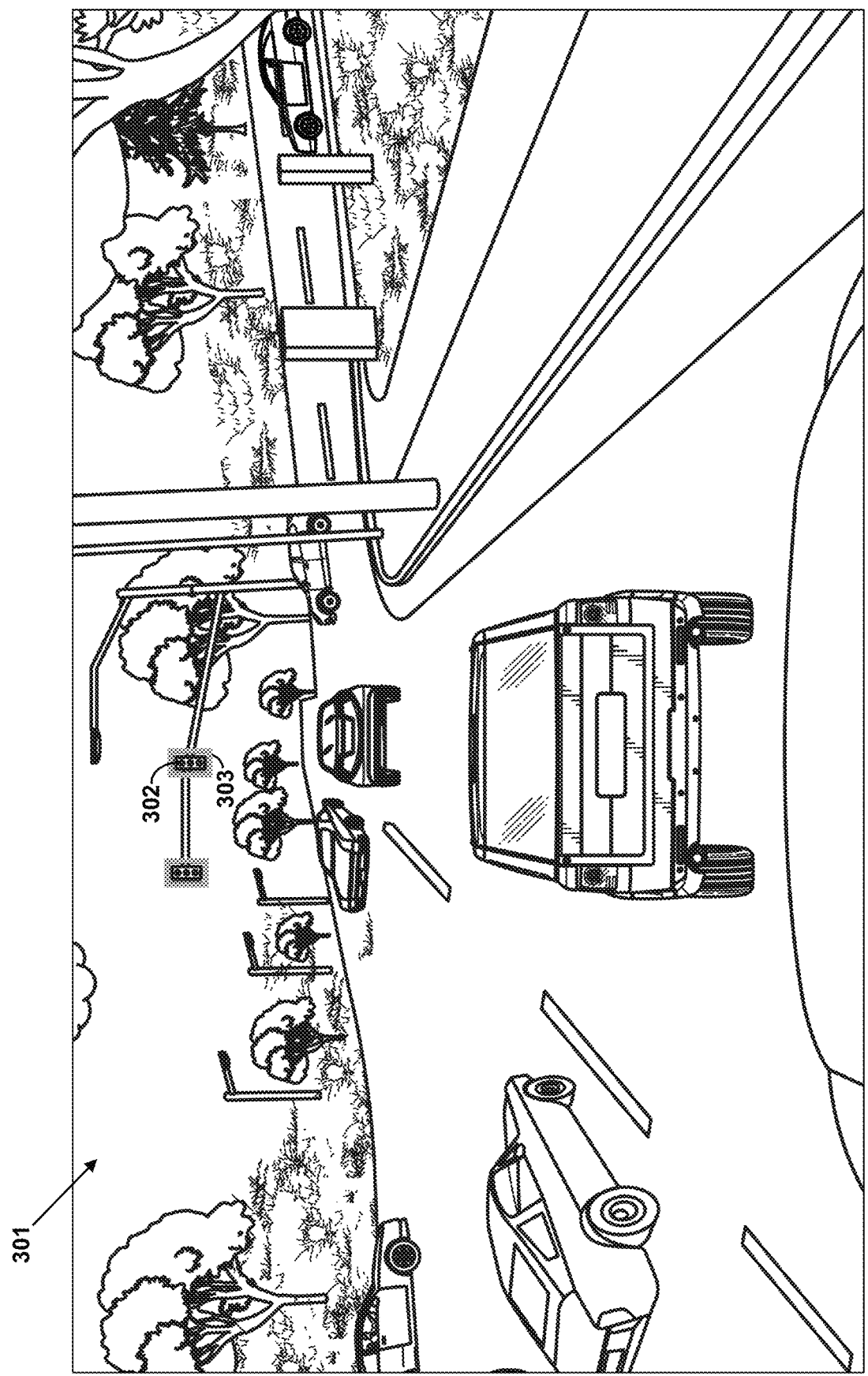
FIG. 3A is a diagram that illustrates one possible example of a source image that may be selected and accessed by the example pipeline of FIGS. 2A-2B.

One possible example of a source image that may be selected and accessed by the example pipeline at block 204A is illustrated in FIG. 3A. As shown in FIG. 3A, the example source image depicts a scene 301 in which a given traffic light 302 appears and has been labeled with a 2D bounding box 303 that demarcates the position of traffic light 302 within depicted scene 301. As further shown in FIG. 3A, depicted scene 301 includes various other real-world elements as well, including another traffic light (which is also labeled with a 2D bounding box).

Turning to block 204B, the example pipeline may select and access a corresponding target image that is comparable to the accessed source image, which may generally take the form of a target image that (i) depicts a similar scene in which the selected real-world element appears but (ii) has not been assigned a label that demarcates the position of selected real-world element within the depicted scene. This function of selecting and accessing a target image that is comparable to the accessed source image may take various forms.

As one possibility, the example pipeline may begin by accessing a repository of the camera images that were captured by sensor-equipped vehicles during the process of creating the target map. As with the camera images in the image repository for the source map, each camera image in this image repository for the target map may have an associated capture pose (i.e., value that indicates the pose of the capturing camera at the time that the camera image was captured), which may be based on measurements from measurements collected by GPS and/or IMU units that were co-located with the camera image's capturing camera on the sensor-equipped vehicle (among other possibilities). The example pipeline could use these capture poses of the camera images within the image repository for the target map to select a target image that is comparable to the accessed source image, which may involve (i) comparing the capture pose of the source image to the capture poses of the camera images within the image repository for the target map, and then (ii) based on this comparison, identifying one or more camera images within the image repository for the target map that have a capture position within a threshold distance of the capture position of the source image and a capture orientation within a threshold rotation of the capture orientation of the source image. In turn, the example pipeline may select the target image from the identified one or more camera images based on various factors. For example, if multiple camera images have been identified, the example pipeline may select the identified camera image having a capture position that is closest to the capture position of the source image, the identified camera image having a capture orientation that is closest to the capture orientation of the source image, or identified camera image having the capture pose that provides the most optimal combination of position difference and orientation difference relative to the capture pose of the source image (e.g., as defined by a multivariate scoring algorithm or the like)—although as described below, the example pipeline may ultimately function to evaluate each of the identified camera images in the manner described herein.

Figure 3B:
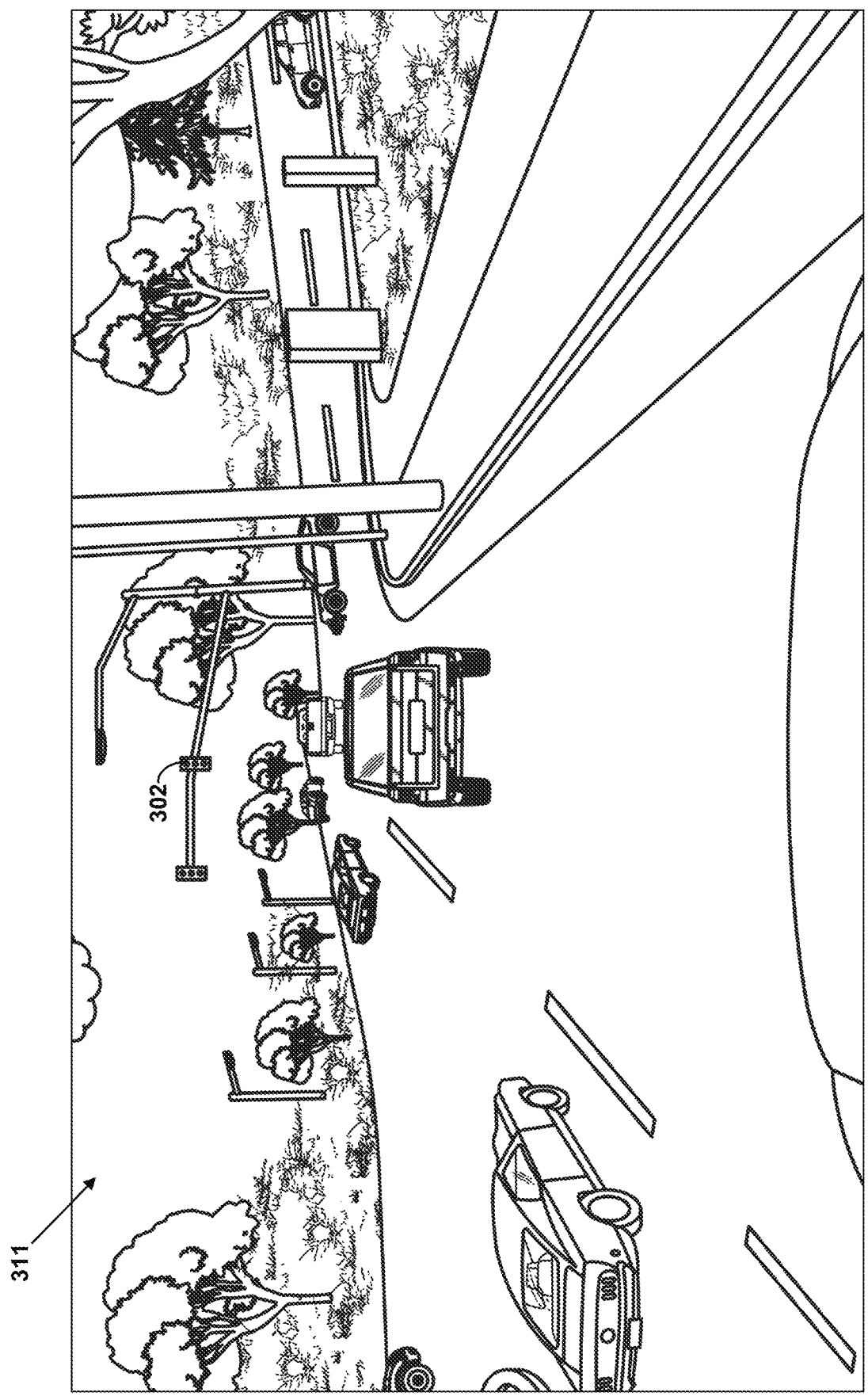
FIG. 3B is a diagram that illustrates one possible example of a target image that may be selected and accessed by the example pipeline of FIGS. 2A-2B.

One possible example of a target image that may be selected and accessed by the example pipeline at block 204B is illustrated in FIG. 3B. As shown in FIG. 3B, the example target image depicts a scene 311 that is similar to scene 301 that was depicted in the example source image of FIG. 3A, including the same traffic light 302 from scene 301, but traffic light 302 has not been labeled in the example target image due to the fact that semantic data has not yet been created for the target map. As further shown in FIG. 3B, depicted scene 311 includes various other real-world elements as well, including another traffic light (which also has not been labeled).

After the corresponding source and target images have been identified, at block 204C, the example pipeline may derive a geometric relationship between the source image and the target image. This function of deriving the geometric relationship between the source image and the target image may take various forms.

In general, each image that is captured by a camera has an associated "camera coordinate frame," which is a 3D coordinate frame that is attached to the optical center of the capturing camera for the image and is thus defined by the pose of the optical center of the capturing camera at the time that the camera image is captured (i.e., the pose the capturing camera's optical center is the point of origin for the camera coordinate frame). In this respect, the source image has an associated camera coordinate frame that is defined by the pose of the optical center of the source image's capturing camera at the time that the source image was captured, the target image has an associated camera coordinate frame that is defined by the pose of the optical center of the target image's capturing camera at the time that the source image was captured, and the geometric relationship between the source image and the target image may be defined in terms of the differences between these two different camera coordinate frames.

For instance, the geometric relationship between the source image and the target image could specifically be represented in terms of (i) a rotation offset R (which may take the form of a matrix) that indicates the difference in orientation between the optical center of the source image's camera coordinate frame and the optical center of the target image's camera coordinate frame and (ii) a translation offset t (which may take the form of a vector) that indicates the difference in position between the optical center of the source image's camera coordinate frame and the optical center of the target image's camera coordinate frame, which may collectively be referred to as the "relative pose" between the source and target images' respective camera coordinate frames.

Figure 3C:
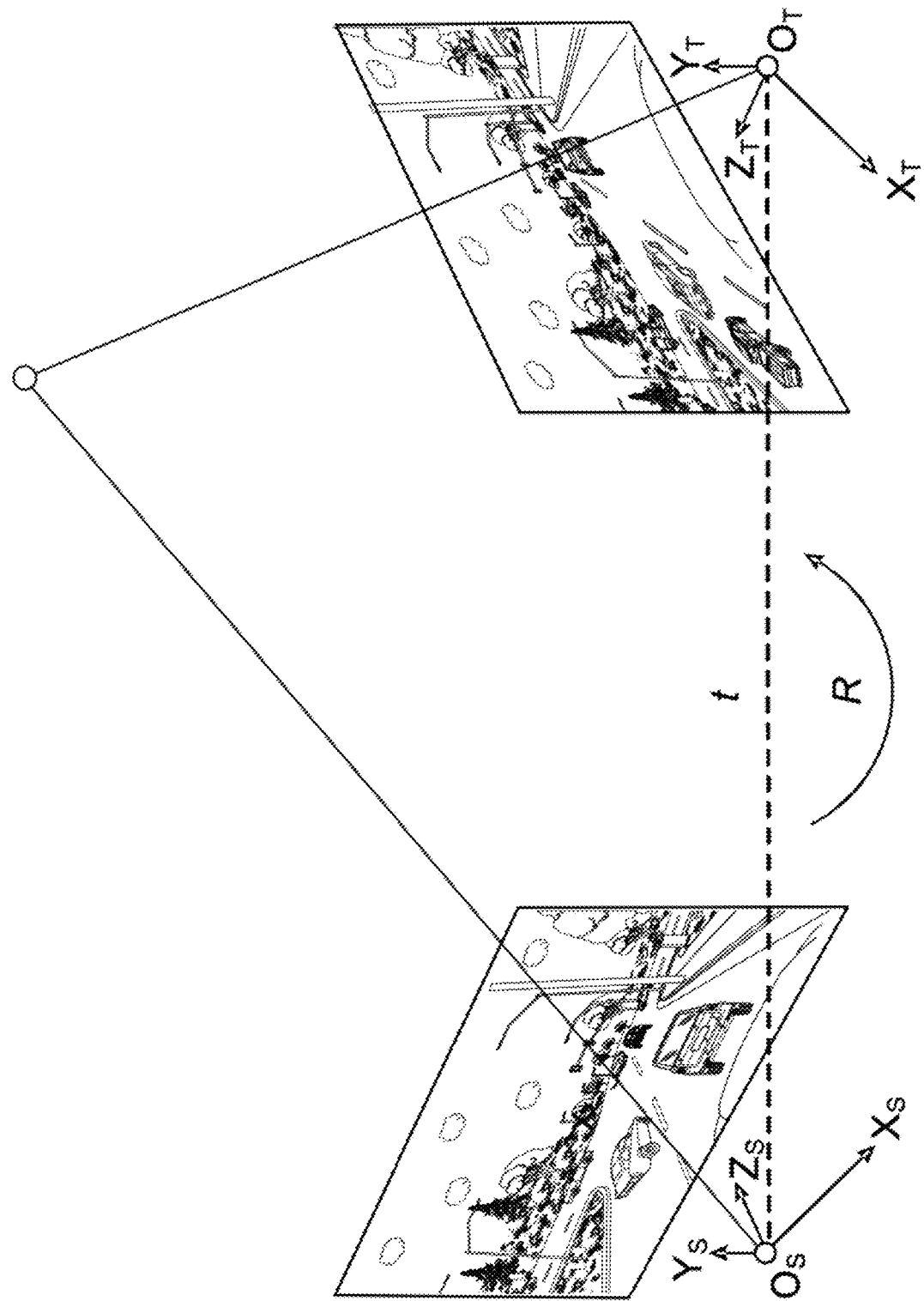
FIG. 3C is a diagram that illustrates one possible way of visualizing the geometric relationship between the source image of FIG. 3A and the target image of FIG. 3B.

One possible way to visualize the geometric relationship between the source and target images is illustrated in FIG. 3C. As shown on the left-hand side of FIG. 3C, the example source image from FIG. 3A is depicted along with its associated camera coordinate frame, which is illustrated as a 3D coordinate frame that has an origin $O_S$, an x-axis $X_S$, a y-axis $Y_S$, and a z-axis $Z_S$, and then on the right-hand side of FIG. 3C, the example target image from FIG. 3B is depicted along with its associated camera coordinate frame, which is illustrated as a 3D coordinate frame has an origin $O_T$, an x-axis $X_T$, a y-axis $Y_T$, and a z-axis $Z_T$. Further, as shown, the difference between these two coordinate frames may be represented in terms of a (i) a rotation offset R that denotes the difference in orientation between the two camera coordinate frames and (ii) a translation offset t that denotes the difference in position between origin $O_S$ and origin $O_T$.

In theory, the relative pose between the source and target images' respective camera coordinate frames could be derived by (i) determining the pose of the optical center of the source image's capturing camera at the time that the source image was captured, (ii) determining the pose of the optical center of the target image's capturing camera at the time that the source image was captured, and then (iii) determining a difference between these two pose values. However, in practice, it is not possible to derive the relative pose between the source and target images' respective camera coordinate frames in this manner, because there is no way to accurately determine the absolute poses of the optical centers of the capturing cameras at the time that the source and target images were captured.

Indeed, while the example pipeline may have access to a capture pose for each of the source and target images, which indicates a measured pose of the capturing camera at the time that the camera image was captured, this capture pose typically cannot be used to determine the pose of the capturing camera's optical center for several reasons. First, the capture pose of a camera image is typically determined based on measurements collected by GPS and/or IMU units that—although being co-located with the capturing camera on the sensor-equipped vehicle—are not aligned with the optical center of the capturing camera. Indeed, these GPS and/or IMU units are most likely separate hardware components from the capturing camera that are not calibrated to the optical center of the capturing camera (and in fact, in some cases, may not even be included within the same computing device as the capturing camera), and the spatial relationship between the capture pose determined based on measurements collected by GPS and/or IMU units and the pose of the capturing camera's optical center is typical unknown. Second, because the capture pose of a camera image is typically determined based on measurements collected by GPS and/or IMU units, which generally can only provide accuracy within a few meters, such a capture pose is not precise enough to serve as a basis for determining the pose of a capturing camera's optical center.

Thus, because it is typically not possible to accurately determine the absolute poses of the optical centers of the source and target images' capturing cameras, the example pipeline may instead function to (i) employ image-processing techniques (e.g., feature matching) to compare the source and target images and then (ii) use the results of the image-processing techniques and the camera intrinsics associated with the source and target images to derive the relative pose between the source image's camera coordinate frame and the target image's camera coordinate frame.

For instance, according to one possible implementation, the example pipeline may begin by performing feature matching between the source and target images, which may involve (i) generating a respective set of features for each of the source and target image (e.g., scale-invariant feature transform (SIFT) features for each image) and then (ii) determining putative matches between the source image's set of features and the target image's set of features. Based on these putative matches between the source image's set of features and the target image's set of features, the example pipeline may then derive a fundamental matrix that represents the relationship in epipolar geometry between pixel positions within the source and target images. This function of deriving the fundamental matrix based on these putative matches between the source image's set of features and the target image's set of features may be carried out using any of various techniques, one example of which may take the form of a Random Sample Consensus (RANSAC) technique that iterates through many different subsets of the putative matches in order to identify the "best" fundamental matrix in the presence of outliers. Other techniques for deriving the fundamental matrix are possible as well.

Next, based on the fundamental matrix and the respective camera intrinsics associated with the source and target images (e.g., focal length and principal point offset of the capturing camera), the example pipeline may (i) derive an essential matrix that represents the relationship in epipolar geometry between the source image's camera coordinate frame and the target image's camera coordinate frame (i.e., the relationship between the optical-center pose associated with the source image and the optical-center pose associated with the target image) and then (ii) use the essential matrix as a basis for deriving the relative pose between the source image's camera coordinate frame and the target image's camera coordinate frame. In this respect, the function of using the essential matrix to derive the relative pose between the source image's camera coordinate frame and the target image's camera coordinate frame may take various forms.

For instance, as one possibility, the function of using the essential matrix to derive the relative pose between the source image's camera coordinate frame and the target image's camera coordinate frame may involve (i) decomposing the essential matrix into two possible rotation offsets and one translation offset that points in two opposite directions, for a total four possible combinations of rotation and translation offsets (i.e., [R1|t], [R1|−t], [R|t], [R2|−t]), (ii) performing a cheirality check to identify which of the four possible combination of rotation and translation offsets produces a triangulated point that would be in front of the capturing cameras for both the source and target images (e.g., by estimating the depth of the matched feature points using triangulation), and then (iii) designating the identification combination of rotation and translation offsets as the relative pose [R|t] that defines the geometric relationship between the source image's camera coordinate frame and the target image's camera coordinate frame. In practice, the relative pose that is derived from the essential matrix in this manner may be reflected in normalized coordinates and may be up to scale.

The example pipeline may derive the geometric relationship between the source image and the target image in various other manners as well.

At block 204D, the example pipeline may then use the derived geometric relationship between the source image and the target image as a basis for transforming the determined position of the selected real-world element within the source map from the source map's coordinate frame to the target map's coordinate frame, which may be used as a basis for positioning the selected real-world element within the target map. This function of using the derived geometric relationship between the source image and the target image to transform the determined position of the selected real-world element within the source map from the source map's coordinate frame to the target map's coordinate frame may take various forms.

According to one possible implementation, the example pipeline may begin by determining the position of the selected real-world element within camera coordinate frame of the source image, which may comprise a single coordinate that represents the real-world element's position within the source image's camera coordinate frame in terms of a single reference point (e.g., a coordinate associated with the real-world element's centerpoint) and/or a set of coordinates that represent the real-world element's position within the source image's camera coordinate frame in terms of a multi-dimensional shape such as a bounding box. The example pipeline may determine the selected real-world element's position within the camera coordinate frame of the source image in various manners.

As one possibility, the selected real-world element's position within the camera coordinate frame of the source image may have already previously been derived and stored together with the source image (e.g., as part of the label for the real-world element that is assigned to the source image) during the process of creating the source map, in which case the example pipeline may determine the selected real-world element's position within camera coordinate frame of the source image by accessing this previously-derived position.

As another possibility, the example pipeline may determine the selected real-world element's position within camera coordinate frame of the source image by translating the 2D position of the real-world element within the source image (which is demarcated by label for the real-world element assigned to the source image) to a 3D position of the real-world element within the source image's camera coordinate system using image data processing techniques.

The example pipeline may determine the selected real-world element's position within the camera coordinate frame of the source image in other manners as well.

After determining the position of the selected real-world element within the source image's camera coordinate frame, the example pipeline may then use the relative pose between the source image's camera coordinate frame and the target image's camera coordinate frame to transform that determined position into a corresponding position within the target image's camera coordinate frame, which may comprise a single coordinate that represents the real-world element's position within the target image's camera coordinate frame in terms of a single reference point (e.g., a coordinate associated with the real-world element's centerpoint) and/or a set of coordinates that represent the real-world element's position within the target image's camera coordinate frame in terms of a multi-dimensional shape such as a bounding box.

Once the example pipeline has transformed the position of the selected real-world element within the source image's camera coordinate frame into a corresponding position of the selected real-world element within the target image's camera coordinate frame, the example pipeline may then optionally validate the position of the selected real-world element within the target image's camera coordinate frame. This validation function may take various forms.

As one possibility, the example pipeline may begin the validation function by employing a technique such as projection (which may utilize the camera intrinsics associated with the target image) to translate the 3D position of the real-world element within the target image's camera coordinate system to a corresponding 2D position of the real-world element within the target image, which may comprise a single pixel coordinate that represents the real-world element's position within the target image in terms of a single reference point (e.g., a coordinate associated with the real-world element's centerpoint) and/or a set of pixel coordinates that represent the real-world element's position within the target image in terms of a multi-dimensional shape such as a bounding box.

In turn, the example pipeline may evaluate whether each such pixel coordinate lies along an epipolar line that is defined based on the corresponding pixel coordinate for the selected real-world element within the source image (which may correspond to one of the vertices of the 2D bounding box for the selected real-world element). In this respect, if the example pipeline determines that each pixel coordinate within the target image lies along the epipolar line that is defined based on the corresponding pixel coordinate within the source image, the example pipeline may conclude that the determined position of the real-world element within the target image's camera coordinate frame is sufficiently accurate, in which case the example pipeline may decide to use that determined position as a basis for positioning the selected real-world element within the target map. On the other hand, if the example pipeline determines that at least one pixel coordinate within the target image does not lie along the epipolar line that is defined based on the corresponding pixel coordinate within the source image, the example pipeline may conclude that the determined position of the real-world element within the target image's camera coordinate frame is not sufficiently accurate (e.g., due to an inaccurate estimation of the geometric relationship between the source and target images), in which case the example pipeline may decide not to use that determined position as a basis for positioning the selected real-world element within the target map.

Figure 3D:
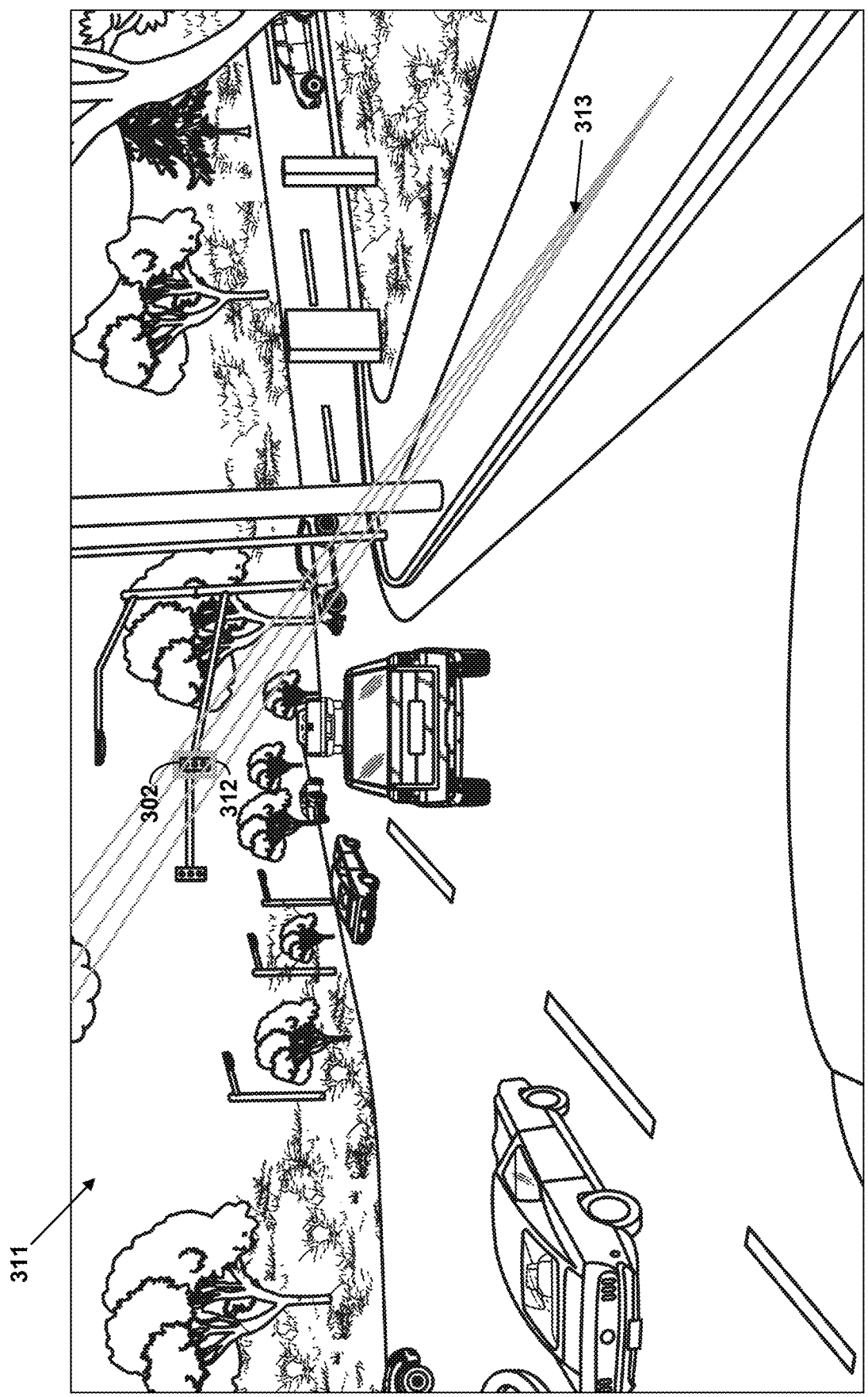
FIG. 3D is a diagram that illustrates one possible example of a validation function that may be performed by the example pipeline of FIGS. 2A-2B.

One possible example of this validation function is illustrated in FIG. 3D, which is an updated version of the example target image shown in FIG. 3B that now includes (i) a bounding box for 312 for traffic light 302 that demarcates the projected 2D position of the real-world element within the target image and (ii) four epipolar lines 313, each of which is defined based on a respective vertex of the bounding box 303 for traffic light 302 that was previously assigned to the example source image shown in FIG. 3A. As shown in FIG. 3D, each vertex of bounding box for 312 lines along the epipolar line 313 that is defined based on the corresponding vertex of bounding box 303, which demonstrates that the determined position of traffic light 302 within the target image's camera coordinate frame is sufficiently accurate.

The function of validating the position of the selected real-world element within the target image's camera coordinate frame.

Lastly, after determining (and optionally validating) the position of the selected real-world element within the target image's camera coordinate frame, the example pipeline may then use the capture pose of the target image to transform that determined position into a corresponding position within the target map's coordinate frame, which may comprise a single coordinate that represents the real-world element's position within the target map's coordinate frame in terms of a single reference point (e.g., a coordinate associated with the real-world element's centerpoint) and/or a set of coordinates that represent the real-world element's position within the target map's coordinate frame in terms of a multi-dimensional shape such as a bounding box.

As noted above, once the example pipeline has determined the position of the selected real-world element within the target map's coordinate frame in the foregoing manner, the example pipeline may then use that determined position as a basis for positioning the selected real-world element within the target map. For instance, as one possible implementation, the example pipeline may be configured to use this determined position for the selected real-world element—which is based on one single pair of corresponding source and target images—as the determined position for the selected real-world element within the target map.

However, given the nature of the image data that is used to create the source and target maps, the selected real-world element is likely to appear in a number of different source and target images. To illustrate with an example, if the source and target image data each has a capture rate of 60 frames per second, then the selected real-world element could potentially appear in up to 60 source images and up to 60 target images for every one second that the selected real-world element was within the respective fields of view of the sensor-equipped vehicles. In this respect, as another possible implementation, the example pipeline may be configured to (i) repeat the foregoing process for each of multiple different pairs of corresponding source and target images in which the selected real-world element appears and then (ii) aggregate the determined positions for the selected real-world element that are based on these different pairs of corresponding source and target images in order to produce an aggregated position for the selected real-world element within the target map, which may further improve the accuracy of where the selected real-world element is ultimately positioned within the target map.

In some implementations, a final validation function could also be performed for the determined position of the selected real-world element within the target map, which may involve the use of augmented reality (AR) technology that overlays the determined position of the selected real-world element within the target map onto a video replay of the target image data.

Turning back to FIG. 2A, at block 205, the example pipeline may then encode a respective data object for each selected real-world element into the target map using (i) the data object for the selected the real-world element that is encoded into the source map and (ii) the position for the selected real-world element within the target map that is determined in the foregoing manner. This function may take various forms.

As one possibility, the example pipeline may encode the data object for the selected real-world element into the target map by (i) creating a copy of the data object for the selected the real-world element that is encoded into the source map, which may include the classification of the selected the real-world element, the determined position of the selected real-world element within the source map, and perhaps other information about the selected real-world element that has been previously determined and encoded into the source map, (ii) updating the copy of the data object to include the determined position of the selected the real-world element within the target map in place of the determined position of the selected real-world element within the source map, and then (iii) incorporating the updated copy of the data object as part of the map data that defines the target map. However, it should be understood that the function of encoding the data object for the selected real-world element into the target map may take other forms as well.

After the example pipeline runs in the manner described above, the target map will end up being encoded with data objects for various different real-world elements without having to recreate those data objects through processing of sensor data and/or human curation, which may advantageously reduce the time and cost that goes into creating the target map.

Once the target map has been created and deployed, it is also possible that future updates could be made to either the source map or the target map. For example, if a new real-world element is later detected within the geographic coverage area of the source or target map (e.g., a new road, a new traffic light, a new traffic sign, etc.), a process may be carried out to update the map data of either the source or the target map so that it includes a representation of this newly-detected real-world element, and this process may involve processing of sensor data and/or human curation. If such an update occurs, the example pipeline described above could then be utilized to transfer this updated map data to the other map that has not been updated, which may avoid the need to recreate that updated map data a second time. For instance, the example pipeline may additional be configured to monitor for future updates to any map that it been previously identified to be part a pair of overlapping maps, and if a future update to any such map is detected, this may trigger the example pipeline to repeat the foregoing process in order to transfer the updated map data from the particular map that has been updated (which will be designated as the source map for purposes of the transfer) to an overlapping map that has not been updated (which will be designated as the target map for purposes of the transfer).

Figure 4:
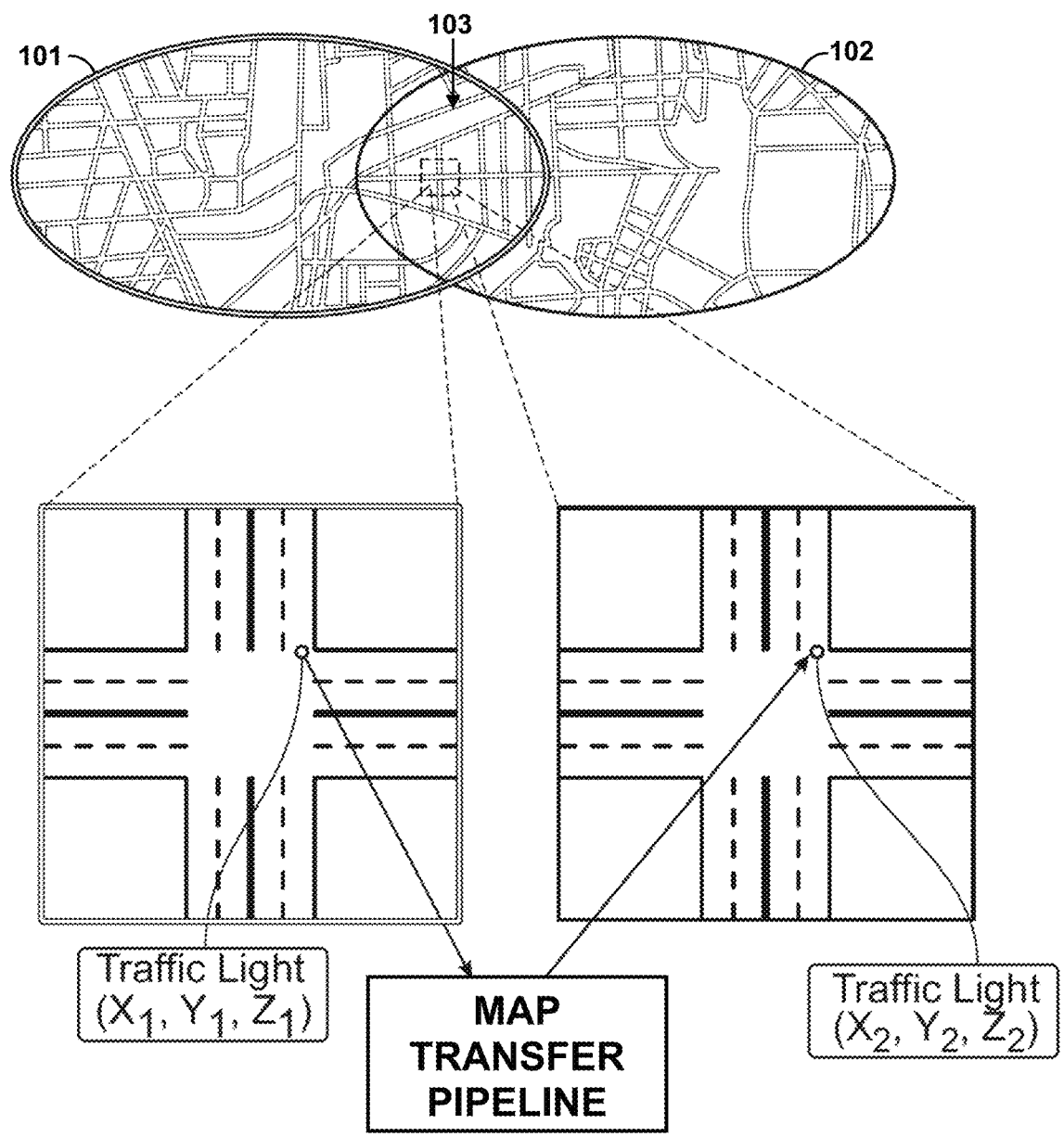
FIG. 4 is a diagram that illustrates one possible example of the benefits provided by the example pipeline of FIGS. 2A-2B.

One possible example of the benefits provided by the example pipeline is illustrated in FIG. 4, which depicts the same general circumstance that was previously shown and described with reference to FIGS. 1A-D. In particular, as shown in FIG. 4, there is a first map 101 that has previously been created for a first geographic region and a second map 102 that is currently in the process of being created for a second geographic region that has an overlapping coverage area 103 with map 101, which presents an opportunity to transfer map data for real-world elements that fall within overlapping area 103—such as a data object has been encoded into map 101 for a given traffic light. However, instead of translating the position of the traffic light from the coordinate frame of map 101 to the coordinate frame of map 102 in the manner described above with reference to FIGS. 1A-1D, the example pipeline described above may be used to translate the position of the traffic light from the coordinate frame of map 101 to the coordinate frame of map 102 based on an evaluation of the geometric relationship between image data used to create map 101 and image data used to create map 102. In this respect, as shown in FIG. 4, the position $(X_2, Y_2, Z_2)$ of the traffic light that is determined using the example pipeline may have a centimeter-level accuracy as opposed to the meter-level accuracy provided by the technique described with reference to FIGS. 1A-1D, which may allow map 102 to be used for a wider range of applications that require a higher level of accuracy.

Figure 5:
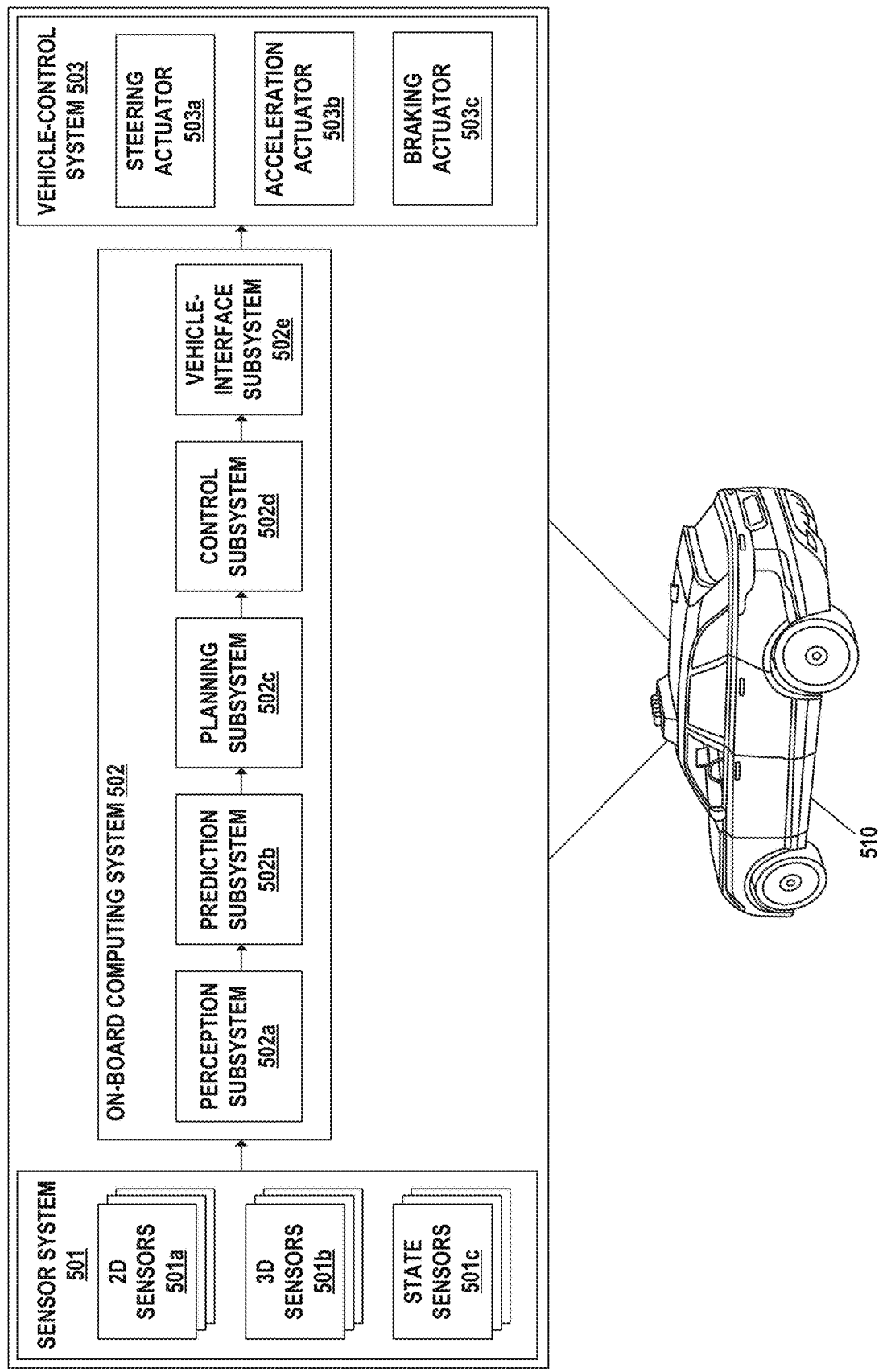
FIG. 5 is a simplified block diagram that illustrates certain systems that may be included in an example vehicle.

In line with the discussion above, as one possible application, a map that has been encoded with data using the disclosed map transfer pipeline may be used by a vehicle equipped with an on-board computing system when performing operations such as localization, perception, prediction and/or planning. Turning now to FIG. 5, a simplified block diagram is provided to illustrate certain systems that may be included in one possible example of such a vehicle. As shown, at a high level, vehicle 500 may include at least (i) a sensor system 501 that is configured to capture sensor data that is representative of the real-world environment being perceived by the vehicle (i.e., the collection vehicle's "surrounding environment") and/or the collection vehicle's operation within that real-world environment, (ii) an on-board computing system 502 that is configured to perform functions related to autonomous operation of vehicle 500 (and perhaps other functions as well), and (iii) a vehicle-control system 503 that is configured to control the physical operation of vehicle 500, among other possibilities. Each of these systems may take various forms.

In general, sensor system 501 may comprise any of various different types of sensors, each of which is generally configured to detect one or more particular stimuli based on vehicle 500 operating in a real-world environment. The sensors then output sensor data that is indicative of one or more measured values of the one or more stimuli at one or more capture times (which may each comprise a single instant of time or a range of times).

For instance, as one possibility, sensor system 501 may include one or more 2D sensors 501a that are each configured to capture 2D sensor data that is representative of the vehicle's surrounding environment. Examples of 2D sensor(s) 501a may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 501a may have an arrangement that is capable of capturing 2D sensor data representing a 350° view of the vehicle's surrounding environment, one example of which may take the form of an array of 6-7 cameras that each have a different capture angle. Other 2D sensor arrangements are also possible.

As another possibility, sensor system 501 may include one or more 3D sensors 501b that are each configured to capture 3D sensor data that is representative of the vehicle's surrounding environment. Examples of 3D sensor(s) 501b may include a LiDAR unit, a 3D RADAR unit, a 3D SONAR unit, a 3D ultrasound unit, and a camera array equipped for stereo vision, among other possibilities. Further, in an example implementation, 3D sensor(s) 501b may comprise an arrangement that is capable of capturing 3D sensor data representing a 350° view of the vehicle's surrounding environment, one example of which may take the form of a LiDAR unit that is configured to rotate 350° around its installation axis. Other 3D sensor arrangements are also possible.

As yet another possibility, sensor system 501 may include one or more state sensors 501c that are each configured capture sensor data that is indicative of aspects of the vehicle's current state, such as the vehicle's current position, current orientation (e.g., heading/yaw, pitch, and/or roll), current velocity, and/or current acceleration of vehicle 500. Examples of state sensor(s) 501c may include an IMU (which may be comprised of accelerometers, gyroscopes, and/or magnetometers), an Inertial Navigation System (INS), a Global Navigation Satellite System (GNSS) unit such as a GPS unit, among other possibilities.

Sensor system 501 may include various other types of sensors as well.

In turn, on-board computing system 502 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 502 may take the form of any one or more interfaces that facilitate communication with other systems of vehicle 500 (e.g., sensor system 501, vehicle-control system 503, etc.) and/or remote computing systems (e.g., a transportation-matching system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 502 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 502 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 502 such that on-board computing system 502 is configured to perform various functions related to the autonomous operation of vehicle 500 (among other possible functions), and (ii) data that may be obtained, derived, or otherwise stored by on-board computing system 502.

In one embodiment, on-board computing system 502 may also be functionally configured into a number of different subsystems that are each tasked with performing a specific subset of functions that facilitate the autonomous operation of vehicle 500, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 502.

As shown in FIG. 5, in one embodiment, the functional subsystems of on-board computing system 502 may include (i) a perception subsystem 502a that generally functions to derive a representation of the surrounding environment being perceived by vehicle 500, (ii) a prediction subsystem 502b that generally functions to predict the future state of each object detected in the vehicle's surrounding environment, (iii) a planning subsystem 502c that generally functions to derive a behavior plan for vehicle 500, (iv) a control subsystem 502d that generally functions to transform the behavior plan for vehicle 500 into control signals for causing vehicle 500 to execute the behavior plan, and (v) a vehicle-interface subsystem 502e that generally functions to translate the control signals into a format that vehicle-control system 503 can interpret and execute. However, it should be understood that the functional subsystems of on-board computing system 502 may take various other forms as well. Each of these example subsystems will now be described in further detail below.

For instance, the subsystems of on-board computing system 502 may begin with perception subsystem 502a, which may be configured to fuse together various different types of "raw" data that relate to the vehicle's perception of its surrounding environment and thereby derive a representation of the surrounding environment being perceived by vehicle 500. In this respect, the "raw" data that is used by perception subsystem 502a to derive the representation of the vehicle's surrounding environment may take any of various forms.

For instance, at a minimum, the "raw" data that is used by perception subsystem 502a may include multiple different types of sensor data captured by sensor system 501, such as 2D sensor data (e.g., image data) that provides a 2D representation of the vehicle's surrounding environment, 3D sensor data (e.g., LIDAR data) that provides a 3D representation of the vehicle's surrounding environment, and/or state data for vehicle 500 that indicates the past and current position, orientation, velocity, and acceleration of vehicle 500. Additionally, the "raw" data that is used by perception subsystem 502a may include map data associated with the vehicle's location, such as high-definition geometric and/or semantic map data, which may be preloaded onto on-board computing system 502 and/or obtained from a remote computing system. Additionally yet, the "raw" data that is used by perception subsystem 502a may include navigation data for vehicle 500 that indicates a specified origin and/or specified destination for vehicle 500, which may be obtained from a remote computing system (e.g., a transportation-matching system) and/or input by a human riding in vehicle 500 via a user-interface component that is communicatively coupled to on-board computing system 502. Additionally still, the "raw" data that is used by perception subsystem 502a may include other types of data that may provide context for the vehicle's perception of its surrounding environment, such as weather data and/or traffic data, which may be obtained from a remote computing system. The "raw" data that is used by perception subsystem 502a may include other types of data as well.

Advantageously, by fusing together multiple different types of raw data (e.g., both 2D sensor data and 3D sensor data), perception subsystem 502a is able to leverage the relative strengths of these different types of raw data in a way that may produce a more accurate and precise representation of the surrounding environment being perceived by vehicle 500.

Further, the function of deriving the representation of the surrounding environment perceived by vehicle 500 using the raw data may include various aspects. For instance, one aspect of deriving the representation of the surrounding environment perceived by vehicle 500 using the raw data may involve determining a current state of vehicle 500 itself, such as a current position, a current orientation, a current velocity, and/or a current acceleration, among other possibilities. In this respect, perception subsystem 502a may also employ a localization technique such as SLAM to assist in the determination of the vehicle's current position and/or orientation. (Alternatively, it is possible that on-board computing system 502 may run a separate localization service that determines position and/or orientation values for vehicle 500 based on raw data, in which case these position and/or orientation values may serve as another input to perception sub system 502a).

Another aspect of deriving the representation of the surrounding environment perceived by vehicle 500 using the raw data may involve detecting objects within the vehicle's surrounding environment, which may result in the determination of class labels, bounding boxes, or the like for each detected object. In this respect, the particular classes of objects that are detected by perception subsystem 502a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 502a may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 500 using the raw data may involve determining a current state of each object detected in the vehicle's surrounding environment, such as a current position (which could be reflected in terms of coordinates and/or in terms of a distance and direction from vehicle 500), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 500, among other possibilities.

The function of deriving the representation of the surrounding environment perceived by vehicle 500 using the raw data may include other aspects as well.

Further yet, the derived representation of the surrounding environment perceived by vehicle 500 may incorporate various different information about the surrounding environment perceived by vehicle 500, examples of which may include (i) a respective set of information for each object detected in the vehicle's surrounding, such as a class label, a bounding box, and/or state information for each detected object, (ii) a set of information for vehicle 500 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 500 may incorporate other types of information about the surrounding environment perceived by vehicle 500 as well.

Still further, the derived representation of the surrounding environment perceived by vehicle 500 may be embodied in various forms. For instance, as one possibility, the derived representation of the surrounding environment perceived by vehicle 500 may be embodied in the form of a data structure that represents the surrounding environment perceived by vehicle 500, which may comprise respective data arrays (e.g., vectors) that contain information about the objects detected in the surrounding environment perceived by vehicle 500, a data array that contains information about vehicle 500, and/or one or more data arrays that contain other semantic information about the surrounding environment. Such a data structure may be referred to as a "parameter-based encoding."

As another possibility, the derived representation of the surrounding environment perceived by vehicle 500 may be embodied in the form of a rasterized image that represents the surrounding environment perceived by vehicle 500 in the form of colored pixels. In this respect, the rasterized image may represent the surrounding environment perceived by vehicle 500 from various different visual perspectives, examples of which may include a "top down" view and a "bird's eye" view of the surrounding environment, among other possibilities. Further, in the rasterized image, the objects detected in the surrounding environment of vehicle 500 (and perhaps vehicle 500 itself) could be shown as color-coded bitmasks and/or bounding boxes, among other possibilities.

The derived representation of the surrounding environment perceived by vehicle 500 may be embodied in other forms as well.

As shown, perception subsystem 502a may pass its derived representation of the vehicle's surrounding environment to prediction subsystem 502b. In turn, prediction subsystem 502b may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 500 to anticipate how the real-world elements in its surrounding environment are likely to behave in the future and then plan its behavior in a way that accounts for this future behavior.

Prediction subsystem 502b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 502b is configured to predict this type of future state information for a detected object at multiple future times, such a time sequence of future states may collectively define a predicted future trajectory of the detected object. Further, in some embodiments, prediction subsystem 502b could be configured to predict multiple different possibilities of future states for a detected object (e.g., by predicting the 3 most-likely future trajectories of the detected object).

Prediction subsystem 502b may be configured to predict other aspects of a detected object's future behavior as well.

In practice, prediction subsystem 502b may predict a future state of an object detected in the vehicle's surrounding environment in various manners, which may depend in part on the type of detected object. For instance, as one possibility, prediction subsystem 502b may predict the future state of a detected object using a data science model that is configured to (i) receive input data that includes one or more derived representations output by perception subsystem 502a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 502, although it is possible that a future-state model could be created by on-board computing system 502 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 502b could predict the future state of a detected object in other manners as well. For instance, for detected objects that have been classified by perception subsystem 502a as belonging to certain classes of static objects (e.g., roads, curbs, lane markings, etc.), which generally do not have the potential to move, prediction subsystem 502b may rely on this classification as a basis for predicting that the future state of the detected object will remain the same at each of the one or more future times (in which case the state-prediction model may not be used for such detected objects). However, it should be understood that detected objects may be classified by perception subsystem 502a as belonging to other classes of static objects that have the potential to change state despite not having the potential to move, in which case prediction subsystem 502b may still use a future-state model to predict the future state of such detected objects. One example of a static object class that falls within this category is a traffic light, which generally does not have the potential to move but may nevertheless have the potential to change states (e.g. between green, yellow, and red) while being perceived by vehicle 500.

After predicting the future state of each object detected in the surrounding environment perceived by vehicle 500 at one or more future times, prediction subsystem 502b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 502b may pass the one or more derived representations of the vehicle's surrounding environment to planning subsystem 502c. In turn, planning subsystem 502c may be configured to use the one or more derived representations of the vehicle's surrounding environment (and perhaps other data) to derive a behavior plan for vehicle 500, which defines the desired driving behavior of vehicle 500 for some future period of time (e.g., the next 5 seconds).

The behavior plan that is derived for vehicle 500 may take various forms. For instance, as one possibility, the derived behavior plan for vehicle 500 may comprise a planned trajectory for vehicle 500 that specifies a planned state of vehicle 500 at each of one or more future times (e.g., each second over the next 5 seconds), where the planned state for each future time may include a planned position of vehicle 500 at the future time, a planned orientation of vehicle 500 at the future time, a planned velocity of vehicle 500 at the future time, and/or a planned acceleration of vehicle 500 (whether positive or negative) at the future time, among other possible types of state information. As another possibility, the derived behavior plan for vehicle 500 may comprise one or more planned actions that are to be performed by vehicle 500 during the future window of time, where each planned action is defined in terms of the type of action to be performed by vehicle 500 and a time and/or location at which vehicle 500 is to perform the action, among other possibilities. The derived behavior plan for vehicle 500 may define other planned aspects of the vehicle's behavior as well.

Further, in practice, planning subsystem 502c may derive the behavior plan for vehicle 500 in various manners. For instance, as one possibility, planning subsystem 502c may be configured to derive the behavior plan for vehicle 500 by (i) deriving a plurality of different "candidate" behavior plans for vehicle 500 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 500. Planning subsystem 502c may derive the behavior plan for vehicle 500 in various other manners as well.

After deriving the behavior plan for vehicle 500, planning subsystem 502c may pass data indicating the derived behavior plan to control subsystem 502d. In turn, control subsystem 502d may be configured to transform the behavior plan for vehicle 500 into one or more control signals (e.g., a set of one or more command messages) for causing vehicle 500 to execute the behavior plan. For instance, based on the behavior plan for vehicle 500, control subsystem 502d may be configured to generate control signals for causing vehicle 500 to adjust its steering in a specified manner, accelerate in a specified manner, and/or brake in a specified manner, among other possibilities.

As shown, control subsystem 502d may then pass the one or more control signals for causing vehicle 500 to execute the behavior plan to vehicle-interface subsystem 502e. In turn, vehicle-interface subsystem 502e may be configured to translate the one or more control signals into a format that can be interpreted and executed by components of vehicle-control system 503. For example, vehicle-interface subsystem 502e may be configured to translate the one or more control signals into one or more control messages are defined according to a particular format or standard, such as a CAN bus standard and/or some other format or standard that is used by components of vehicle-control system 503.

In turn, vehicle-interface subsystem 502e may be configured to direct the one or more control signals to the appropriate control components of vehicle-control system 503. For instance, as shown, vehicle-control system 503 may include a plurality of actuators that are each configured to control a respective aspect of the vehicle's physical operation, such as a steering actuator 503a that is configured to control the vehicle components responsible for steering (not shown), an acceleration actuator 503b that is configured to control the vehicle components responsible for acceleration such as a throttle (not shown), and a braking actuator 503c that is configured to control the vehicle components responsible for braking (not shown), among other possibilities. In such an arrangement, vehicle-interface subsystem 502e of on-board computing system 502 may be configured to direct steering-related control signals to steering actuator 503a, acceleration-related control signals to acceleration actuator 503b, and braking-related control signals to braking actuator 503c. However, it should be understood that the control components of vehicle-control system 503 may take various other forms as well.

Notably, the subsystems of on-board computing system 502 may be configured to perform the above functions in a repeated manner, such as many times per second, which may enable vehicle 500 to continually update both its understanding of the surrounding environment and its planned behavior within that surrounding environment.

Although not specifically shown, it should be understood that vehicle 500 includes various other systems and components as well, including but not limited to a propulsion system that is responsible for creating the force that leads to the physical movement of vehicle 500.

Figure 6:
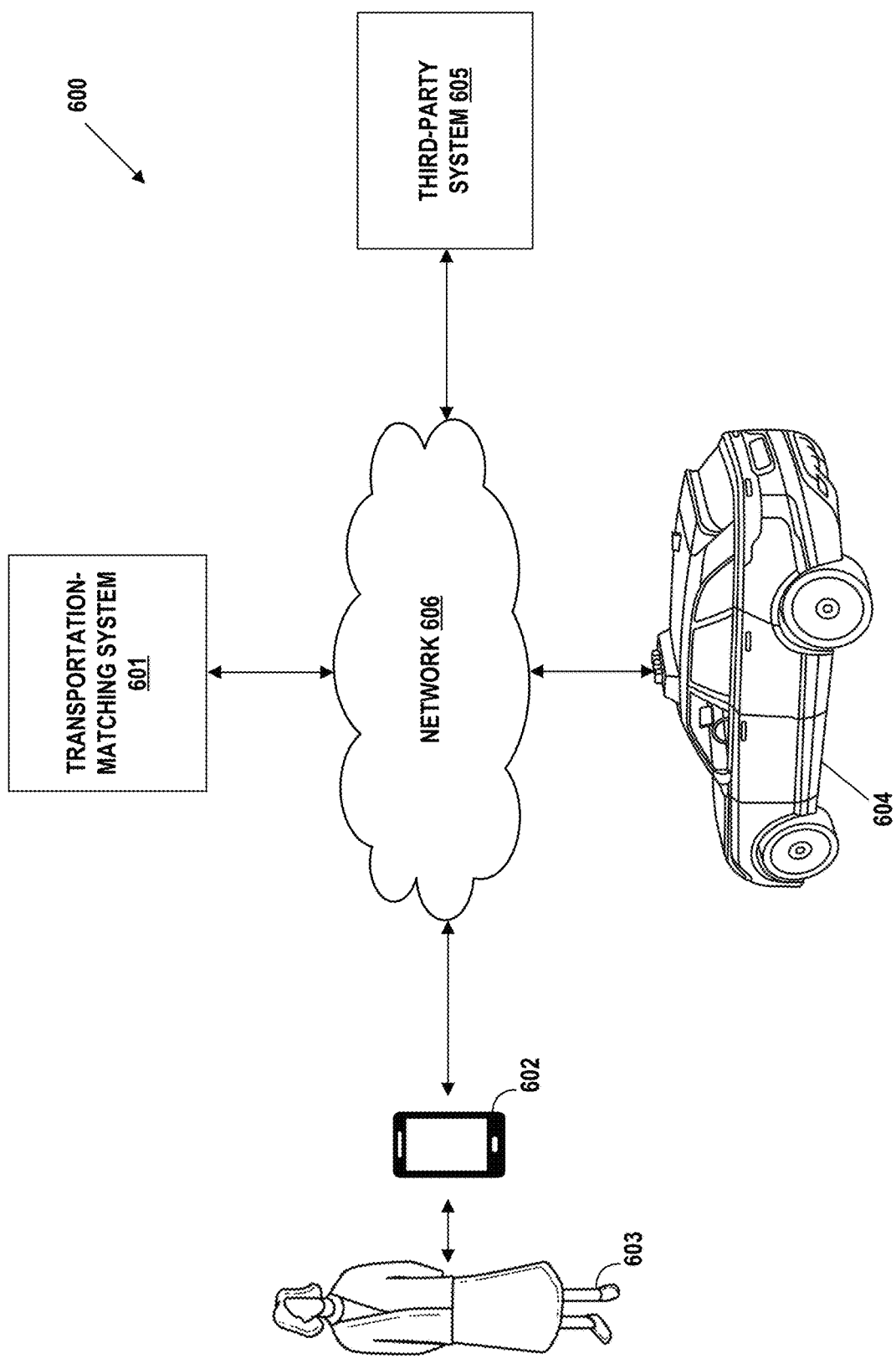
FIG. 6 is a simplified block diagram that illustrates one example of a transportation-matching platform.

In line with the discussion above, as another possible application, a map that has been encoded with data using the disclosed map transfer pipeline may be used by a transportation-matching platform when performing various different operations, including but not limited to matching individuals with available vehicles, generating routes for vehicles to follow when picking up and/or transporting individuals, providing estimates of pickup and drop-off times, determining good and bad locations to perform pickups and drop-offs, and/or pre-positioning vehicles within the given area in anticipation of responding to transportation requests, among other possibilities. Turning now to FIG. 6, a simplified block diagram is provided to illustrate one example of a transportation-matching platform 600 that functions to match individuals interested in obtaining transportation from one location to another with transportation options, such as vehicles that are capable of providing the requested transportation. As shown, transportation-matching platform 600 may include at its core a transportation-matching system 601, which may be communicatively coupled via a communication network 606 to (i) a plurality of client stations of individuals interested in transportation (i.e., "transportation requestors"), of which client station 602 of transportation requestor 603 is shown as one representative example, (ii) a plurality of vehicles that are capable of providing the requested transportation, of which vehicle 604 is shown as one representative example, and (iii) a plurality of third-party systems that are capable of providing respective sub-services that facilitate the platform's transportation matching, of which third-party system 605 is shown as one representative example.

Broadly speaking, transportation-matching system 601 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 601 may comprise computing infrastructure of a public, private, and/or hybrid cloud (e.g., computing and/or storage clusters). In this respect, the entity that owns and operates transportation-matching system 601 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 601 may comprise one or more dedicated servers. Other implementations of transportation-matching system 601 are possible as well.

As noted, transportation-matching system 601 may be configured to perform functions related to managing and facilitating transportation matching, which may take various forms. For instance, as one possibility, transportation-matching system 601 may be configured to receive transportation requests from client stations of transportation requestors (e.g., client station 602 of transportation requestor 603) and then fulfill such transportation requests by dispatching suitable vehicles, which may include vehicle 604. In this respect, a transportation request from client station 602 of transportation requestor 603 may include various types of information.

For example, a transportation request from client station 602 of transportation requestor 603 may include specified pick-up and drop-off locations for the transportation. As another example, a transportation request from client station 602 of transportation requestor 603 may include an identifier that identifies transportation requestor 603 in transportation-matching system 601, which may be used by transportation-matching system 601 to access information about transportation requestor 603 (e.g., profile information) that is stored in one or more data stores of transportation-matching system 601 (e.g., a relational database system), in accordance with the transportation requestor's privacy settings. This transportation requestor information may take various forms, examples of which include profile information about transportation requestor 603. As yet another example, a transportation request from client station 602 of transportation requestor 603 may include preferences information for transportation requestor 603, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 601 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 601 receives a request for transportation from San Francisco International Airport (SFO) to Palo Alto, Calif., system 601 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 601. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 601.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 601 could be configured to predict and provide transportation suggestions in response to a transportation request. For instance, transportation-matching system 601 may be configured to apply one or more machine-learning techniques to such historical data in order to "train" a machine-learning model to predict transportation suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 601 may only be capable of storing and later accessing historical data for a given transportation requestor if the given transportation requestor previously decided to "opt-in" to having such information stored. In this respect, transportation-matching system 601 may maintain respective privacy settings for each transportation requestor that uses transportation-matching platform 600 and operate in accordance with these settings. For instance, if a given transportation requestor did not opt-in to having his or her information stored, then transportation-matching system 601 may forgo performing any of the above-mentioned functions based on historical data. Other possibilities also exist.

Transportation-matching system 601 may be configured to perform various other functions related to managing and facilitating transportation matching as well.

Referring again to FIG. 6, client station 602 of transportation requestor 603 may generally comprise any computing device that is configured to facilitate interaction between transportation requestor 603 and transportation-matching system 601. For instance, client station 602 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 603 and transportation-matching system 601 (which may be embodied in the form of a software application, such as a mobile application, web application, or the like). In this respect, the interaction that may take place between transportation requestor 603 and transportation-matching system 601 may take various forms, representative examples of which may include requests by transportation requestor 603 for new transportation events, confirmations by transportation-matching system 601 that transportation requestor 603 has been matched with a vehicle (e.g., vehicle 604), and updates by transportation-matching system 601 regarding the progress of the transportation event, among other possibilities.

In turn, vehicle 604 may generally comprise any kind of vehicle that can provide transportation, and in one example, may take the form of vehicle 500 described above. Further, the functionality carried out by vehicle 604 as part of transportation-matching platform 600 may take various forms, representative examples of which may include receiving a request from transportation-matching system 601 to handle a new transportation event, driving to a specified pickup location for a transportation event, driving from a specified pickup location to a specified drop-off location for a transportation event, and providing updates regarding the progress of a transportation event to transportation-matching system 601, among other possibilities.

Generally speaking, third-party system 605 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 601.

Moreover, third-party system 605 may be configured to perform functions related to various subservices. For instance, as one possibility, third-party system 605 may be configured to monitor traffic conditions and provide traffic data to transportation-matching system 601 and/or vehicle 604, which may be used for a variety of purposes. For example, transportation-matching system 601 may use such data to facilitate fulfilling transportation requests in the first instance and/or updating the progress of initiated transportation events, and vehicle 604 may use such data to facilitate updating certain predictions regarding perceived agents and/or the vehicle's behavior plan, among other possibilities.

As another possibility, third-party system 605 may be configured to monitor weather conditions and provide weather data to transportation-matching system 601 and/or vehicle 604, which may be used for a variety of purposes. For example, transportation-matching system 601 may use such data to facilitate fulfilling transportation requests in the first instance and/or updating the progress of initiated transportation events, and vehicle 604 may use such data to facilitate updating certain predictions regarding perceived agents and/or the collection vehicle's behavior plan, among other possibilities.

As yet another possibility, third-party system 605 may be configured to authorize and process electronic payments for transportation requests. For example, after transportation requestor 603 submits a request for a new transportation event via client station 602, third-party system 605 may be configured to confirm that an electronic payment method for transportation requestor 603 is valid and authorized and then inform transportation-matching system 601 of this confirmation, which may cause transportation-matching system 601 to dispatch vehicle 604 to pick up transportation requestor 603. After receiving a notification that the transportation event is complete, third-party system 605 may then charge the authorized electronic payment method for transportation requestor 603 according to the fare for the transportation event. Other possibilities also exist.

Third-party system 605 may be configured to perform various other functions related to subservices that facilitate the platform's transportation matching as well. It should be understood that, although certain functions were discussed as being performed by third-party system 605, some or all of these functions may instead be performed by transportation-matching system 601.

As discussed above, transportation-matching system 601 may be communicatively coupled to client station 602, vehicle 604, and third-party system 605 via communication network 606, which may take various forms. For instance, at a high level, communication network 606 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 6 may take other forms as well, including the possibility that such communication paths include communication links and/or intermediate devices that are not shown.

In the foregoing arrangement, client station 602, vehicle 604, and/or third-party system 605 may also be capable of indirectly communicating with one another via transportation-matching system 601. Additionally, although not shown, it is possible that client station 602, vehicle 604, and/or third-party system 605 may be configured to communicate directly with one another as well (e.g., via a short-range wireless communication path or the like). Further, vehicle 604 may also include a user-interface system that may facilitate direct interaction between transportation requestor 603 and vehicle 604 once transportation requestor 603 enters vehicle 604 and the transportation event begins.

It should be understood that transportation-matching platform 600 may include various other entities and take various other forms as well.

Turning now to FIG. 7, a simplified block diagram is provided to illustrate some structural components that may be included in an example computing platform 700, which may be configured to carry out the any of various functions disclosed herein—including but not limited to the functions of the example pipeline described with reference to FIGS. 2A-2B. At a high level, computing platform 700 may generally comprise any one or more computer systems (e.g., one or more servers) that collectively include at least a processor 702, data storage 704, and a communication interface 706, all of which may be communicatively linked by a communication link 708 that may take the form of a system bus, a communication network such as a public, private, or hybrid cloud, or some other connection mechanism. Each of these components may take various forms.

For instance, processor 702 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 702 could comprise processing components that are distributed across a plurality of physical computing devices connected via a network, such as a computing cluster of a public, private, or hybrid cloud.

In turn, data storage 704 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 704 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 7, data storage 704 may be capable of storing both (i) program instructions that are executable by processor 702 such that computing platform 700 is configured to perform any of the various functions disclosed herein (including but not limited to any the functions described above with reference to FIGS. 2A-2B), and (ii) data that may be received, derived, or otherwise stored by computing platform 700.

Communication interface 706 may take the form of any one or more interfaces that facilitate communication between computing platform 700 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 700 may additionally include one or more input/output (I/O) interfaces that are configured to either (i) receive and/or capture information at computing platform 700 and (ii) output information from computing platform 700 (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 700 is one example of a computing platform that may be used with the embodiments described herein. Numerous other arrangements are possible and contemplated herein. For instance, other computing platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
    identifying a source map and a target map for transferring map data, wherein the source map and the target map have different respective map coordinate frames, wherein the source map has a first coverage area that at least partially overlaps with a second coverage area of the target map, wherein the source map is created based at least in part on processing of sensor data comprising a set of multiple source images captured by one or more cameras traversing the first coverage area and the target map is created based at least in part on processing of sensor data comprising a set of multiple target images captured by one or more cameras traversing the second coverage area, and wherein the source map has already been encoded with previously-created map data for one or more real-world elements located where the first and second coverage areas overlap;
    selecting a real-world element for which to transfer previously-created map data from the source map to the target map, wherein the selected real-world element comprises an element that physically exists in the real world and is located within an overlapping area between the first coverage area of the source map and the second coverage area of the target map, and wherein the previously-created map data indicates a first position of the selected real-world element according to the respective map coordinate frame of the source map;
    based on the selected real-world element, selecting, from the set of multiple source images used to create the source map, a source image captured by a first camera, wherein (i) the selected real-world element is included in the source image, (ii) the source image is associated with a first camera coordinate frame attached to the first camera that differs from the respective map coordinate frame of the source map, and (iii) the source image has an associated label that is indicative of a second position of the selected real-world element according to the first camera coordinate frame;
    based on the selected real-world element, selecting, from the set of multiple target images used to create the target map, a target image captured by a second camera, wherein (i) the selected real-world element is included in the target image and (ii) the target image is associated with a second camera coordinate frame attached to the second camera that differs from the respective map coordinate frame of the target map;
    deriving a geometric relationship between the first camera coordinate frame associated with the source image and the second camera coordinate frame associated with the target image, wherein the derived geometric relationship indicates a rotation offset and a translation offset between the first camera coordinate frame associated with the source image and the second camera coordinate frame associated with the target image, and wherein the geometric relationship is derived based on (i) a derived geometric relationship between respective pixel positions of matched features within the source and target images and (ii) respective camera intrinsics for the first and second cameras;
    using the label associated with the source image and the derived geometric relationship between the first camera coordinate frame associated with the source image and the second camera coordinate frame associated with the target image to determine a third position of the selected real-world element according to the respective map coordinate frame of the target map; and
    encoding the target map with map data for the selected real-world element that indicates the third position of the selected real-world element according to the respective map coordinate frame of the target map.

2. The computer-implemented method of claim 1, wherein the selected real-world element comprises a semantic real-world road element for which a data object has previously been encoded into the source map.

3. The computer-implemented method of claim 1, wherein selecting the real-world element for which to transfer the previously-created map data from the source map to the target map comprises:
    determining that a confidence level associated with the previously-created map data for the real-world element satisfies a threshold confidence level.

4. The computer-implemented method of claim 1, wherein selecting the target image from the set of multiple target images based on the selected real-world element comprises:
    determining a capture pose of the source image that is selected based on the selected real-world element;
    comparing the capture pose of the source image to a respective capture pose of each of a plurality of camera images in the set of multiple target images used to create the target map;
    based on the comparing, identifying one or more camera images in the set of multiple target images used to create the target map having a capture pose that is within both a threshold distance and a threshold rotation of the capture pose of the source image; and selecting the target image from the identified one or more camera images.

5. The computer-implemented method of claim 1, wherein deriving the geometric relationship between the first camera coordinate frame associated with the source image and the second camera coordinate frame associated with the target image comprises:
   identifying the matched features within the source image and the target image;
   based on the matched features, deriving a first matrix that represents the derived geometric relationship between the respective pixel positions of the matched features within the source image and the target image;
   based on the first matrix and the respective camera intrinsics for the first and second cameras, deriving a second matrix that represents a relationship in epipolar geometry between the first camera coordinate frame associated with the source image and the second camera coordinate frame associated with the target image; and
   using the second matrix to determine (i) the rotation offset between the first camera coordinate frame associated with the source image and the second camera coordinate frame associated with the target image and (ii) the translation offset between the first camera coordinate frame associated with the source image and the second camera coordinate frame associated with the target image, wherein the rotation offset and the translation offset collectively define the geometric relationship between the first camera coordinate frame associated with the source image and the second camera coordinate frame associated with the target image.

6. The computer-implemented method of claim 5, wherein using the label associated with the source image and the derived geometric relationship between the first camera coordinate frame associated with the source image and the second camera coordinate frame associated with the target image to determine the third position of the selected real-world element according to the respective map coordinate frame of the target map comprises:
   based on the label associated with the source image, determining the second position of the selected real-world element according to the first camera coordinate frame associated with the source image;
   using the rotation offset and the translation offset to transform the determined second position of the selected real-world element according to the first camera coordinate frame associated with the source image to a corresponding fourth position of the selected real-world element according to the second camera coordinate frame associated with the target image; and
   translating the fourth position of the selected real-world element according to the second camera coordinate frame associated with the target image to the third position of the selected real-world element according to the respective map coordinate frame of the target map.

7. The computer-implemented method of claim 6, further comprising:
   validating the fourth position of the selected real-world element according to the second camera coordinate frame associated with the target image using epipolar lines that are defined based on the label associated with the source image for the selected real-world element.

8. The computer-implemented method of claim 1, wherein the map data for the selected real-world element that is encoded into the target map comprises at least a portion of the previously-created map data for the selected real-world element that was encoded into the source map.

9. The computer-implemented method of claim 1, wherein the selected source and target images comprise a first pair of source and target images, the method further comprising:
   selecting, from the sets of source and target images, one or more additional pairs of source and target images that include the selected real-world element, wherein (i) the respective source image in each additional pair was captured by a respective first camera and is associated with a respective first camera coordinate frame attached to the respective first camera that differs from the respective map coordinate frame of the source map, (ii) the respective source image in each additional pair has an associated label that is indicative of a respective position of the selected real-world element according to the respective first camera coordinate frame associated with the respective source image, and (iii) the respective target image in each additional pair was captured by a respective second camera and is associated with a respective second camera coordinate frame attached to the respective second camera that differs from the respective map coordinate frame of the target map;
   for each of the one or more additional pairs of source and target images, (i) deriving a respective geometric relationship between the respective first camera coordinate frame associated with the respective source image in the additional pair and the respective second camera coordinate frame associated with the respective target image in the additional pair, wherein the respective geometric relationship indicates a rotation offset and a translation offset between the respective first camera coordinate frame associated with the respective source image in the additional pair and the respective second camera coordinate frame associated with the respective target image in the additional pair, and (ii) using the label associated with the respective source image in the additional pair and the respective geometric relationship between the respective first camera coordinate frame associated with the respective source image in the additional pair and the respective second camera coordinate frame associated with the respective target image in the additional pair to determine a respective position of the selected real-world element according to the respective map coordinate frame of the target map; and
   producing an aggregated position of the selected real-world element according to the respective map coordinate frame of the target map by aggregating (i) the third position of the selected real-world element according to the respective map coordinate frame of the target map that is determined based on the first pair of source and target images with (ii) the respective position of the selected real-world element according to the respective map coordinate frame of the target map that is determined based on each of the one or more additional pairs of source and target images.

10. A non-transitory computer-readable medium comprising program instructions stored thereon that, when executed by at least one processor of a computing system, cause the computing system to perform functions comprising:
   identifying a source map and a target map for transferring map data, wherein the source map and the target map have different respective map coordinate frames, wherein the source map has a first coverage area that at least partially overlaps with a second coverage area of the target map, wherein the source map is created based at least in part on processing of sensor data comprising a set of multiple source images captured by one or more cameras traversing the first coverage area and the target map is created based at least in part on processing of sensor data comprising a set of multiple target images captured by one or more cameras traversing the second coverage area, and wherein the source map has already been encoded with previously-created map data for one or more real-world elements located where the first and second coverage areas overlap;

selecting a real-world element for which to transfer previously-created map data from the source map to the target map, wherein the selected real-world element comprises an element that physically exists in the real world and is located within an overlapping area between the first coverage area of the source map and the second coverage area of the target map, and wherein the previously-created map data indicates a first position of the selected real-world element according to the respective map coordinate frame of the source map;

based on the selected real-world element, selecting, from the set of multiple source images used to create the source map, a source image captured by a first camera, wherein (i) the selected real-world element is included in the source image, (ii) the source image is associated with a first camera coordinate frame attached to the first camera that differs from the respective map coordinate frame of the source map, and (iii) the source image has an associated label that is indicative of a second position of the selected real-world element according to the first camera coordinate frame;

based on the selected real-world element, selecting, from the set of multiple target images used to create the target map, a target image captured by a second camera, wherein (i) the selected real-world element is included in the target image and (ii) the target image is associated with a second camera coordinate frame attached to the second camera that differs from the respective map coordinate frame of the target map;

deriving a geometric relationship between the first camera coordinate frame associated with the source image and the second camera coordinate frame associated with the target image, wherein the derived geometric relationship indicates a rotation offset and a translation offset between the first camera coordinate frame associated with the source image and the second camera coordinate frame associated with the target image, and wherein the geometric relationship is derived based on (i) a derived geometric relationship between respective pixel positions of matched features within the source and target images and (ii) respective camera intrinsics for the first and second cameras;

using the label associated with the source image and the derived geometric relationship between the first camera coordinate frame associated with the source image and the second camera coordinate frame associated with the target image to determine a third position of the selected real-world element according to the respective map coordinate frame of the target map; and encoding the target map with map data for the selected real-world element that indicates the third position of the selected real-world element according to the respective map coordinate frame of the target map.

11. The non-transitory computer-readable medium of claim 10, wherein the selected real-world element comprises a real-world road element for which a data object has previously been encoded into the source map.

12. The non-transitory computer-readable medium of claim 10, wherein selecting the real-world element for which to transfer the previously-created map data from the source map to the target map comprises:
determining that a confidence level associated with the previously-created map data for the real-world element satisfies a threshold confidence level.

13. The non-transitory computer-readable medium of claim 10, wherein selecting the target image from the set of multiple target images based on the selected real-world element comprises:
determining a capture pose of the source image that is selected based on the selected real-world element;
comparing the capture pose of the source image to a respective capture pose of each of a plurality of camera images in the set of multiple target images used to create the target map;
based on the comparing, identifying one or more camera images in the set of multiple target images used to create the target map having a capture pose that is within both a threshold distance and a threshold rotation of the capture pose of the source image; and
selecting the target image from the identified one or more camera images.

14. The non-transitory computer-readable medium of claim 10, wherein deriving the geometric relationship between the first camera coordinate frame associated with the source image and the second camera coordinate frame associated with the target image comprises:
identifying the matched features within the source image and the target image;
based on the matched features, deriving a first matrix that represents the derived geometric relationship between the respective pixel positions of the matched features within the source image and the target image;
based on the first matrix and the respective camera intrinsics for the first and second cameras, deriving a second matrix that represents a relationship in epipolar geometry between the first camera coordinate frame associated with the source image and the second camera coordinate frame associated with the target image; and
using the second matrix to determine (i) the rotation offset between the first camera coordinate frame associated with the source image and the second camera coordinate frame associated with the target image and (ii) the translation offset between the first camera coordinate frame associated with the source image and the second camera coordinate frame associated with the target image, wherein the rotation offset and the translation offset collectively define the geometric relationship between the first camera coordinate frame associated with the source image and the second camera coordinate frame associated with the target image.

15. The non-transitory computer-readable medium of claim 14, wherein using the label associated with the source image and the derived geometric relationship between the first camera coordinate frame associated with the source image and the second camera coordinate frame associated with the target image to determine the third position of the selected real-world element according to the respective map coordinate frame of the target map comprises:
based on the label associated with the source image, determining the second position of the selected real-world element according to the first camera coordinate frame associated with the source image;

using the rotation offset and the translation offset to transform the determined second position of the selected real-world element according to the first camera coordinate frame associated with the source image to a corresponding fourth position of the selected real-world element according to the second camera coordinate frame associated with the target image; and translating the fourth position of the selected real-world element according to the second camera coordinate frame associated with the target image to the third position of the selected real-world element according to the respective map coordinate frame of the target map.

16. The non-transitory computer-readable medium of claim 15, further comprising program instructions stored thereon that, when executed by at the least one processor of the computing system, cause the computing system to perform functions comprising:

validating the fourth position of the selected real-world element according to the second camera coordinate frame associated with the target image using epipolar lines that are defined based on the label associated with the source image for the selected real-world element.

17. The non-transitory computer-readable medium of claim 10, wherein the map data for the selected real-world element that is encoded into the target map comprises at least a portion of the previously-created map data for the selected real-world element that was encoded into the source map.

18. The non-transitory computer-readable medium of claim 10, wherein the selected source and target images comprises a first pair of source and target images, and wherein the non-transitory computer-readable medium further comprises program instructions stored thereon that, when executed by at the least one processor of the computing system, cause the computing system to perform functions comprising:

selecting, from the sets of source and target images, one or more additional pairs of source and target images that include the selected real-world element, wherein (i) the respective source image in each additional pair was captured by a respective first camera and is associated with a respective first camera coordinate frame attached to the respective first camera that differs from the respective map coordinate frame of the source map, (ii) the respective source image in each additional pair has an associated label that is indicative of a respective position of the selected real-world element according to the respective first camera coordinate frame associated with the respective source image, and (iii) the respective target image in each additional pair was captured by a respective second camera and is associated with a respective second camera coordinate frame attached to the respective second camera that differs from the respective map coordinate frame of the target map;

for each of the one or more additional pairs of source and target images, (i) deriving a respective geometric relationship between the respective first camera coordinate frame associated with the respective source image in the additional pair and the respective second camera coordinate frame associated with the respective target image in the additional pair, wherein the respective geometric relationship indicates a rotation offset and a translation offset between the respective first camera coordinate frame associated with the respective source image in the additional pair and the respective second camera coordinate frame associated with the respective target image in the additional pair, and (ii) using the label associated with the respective source image in the additional pair and the respective geometric relationship between the respective first camera coordinate frame associated with the respective source image in the additional pair and the respective second camera coordinate frame associated with the respective target image in the additional pair to determine a respective position of the selected real-world element according to the respective map coordinate frame of the target map; and producing an aggregated position of the selected real-world element according to the respective map coordinate frame of the target map by aggregating (i) the third position of the selected real-world element according to the respective map coordinate frame of the target map that is determined based on the first pair of source and target images with (ii) the respective position of the selected real-world element according to the respective map coordinate frame of the target map that is determined based on each of the one or more additional pairs of source and target images.

19. A computing system comprising:

at least one processor;

a non-transitory computer-readable medium; and program instructions stored on the non-transitory computer-readable medium that are executable by the at least one processor such that the computing system is configured to:

identify a source map and a target map for transferring map data, wherein the source map and the target map have different respective map coordinate frames, wherein the source map has a first coverage area that at least partially overlaps with a second coverage area of the target map, wherein the source map is created based at least in part on processing of sensor data comprising a set of multiple source images captured by one or more cameras traversing the first coverage area and the target map is created based at least in part on processing of sensor data comprising a set of multiple target images captured by one or more cameras traversing the second coverage area, and wherein the source map has already been encoded with previously-created map data for one or more real-world elements located where the first and second coverage areas overlap;

select a real-world element for which to transfer previously-created map data from the source map to the target map, wherein the selected real-world element comprises an element that physically exists in the real world and is located within an overlapping area between the first coverage area of the source map and the second coverage area of the target map, and wherein the previously-created map data indicates a first position of the selected real-world element according to the respective map coordinate frame of the source map;

based on the selected real-world element, select, from the set of multiple source images used to create the source map, a source image captured by a first camera, wherein (i) the selected real-world element is included in the source image, (ii) the source image is associated with a first camera coordinate frame attached to the first camera that differs from the respective map coordinate frame of the source map, and (iii) the source image has an associated label that is indicative of a second position of the selected real-world element according to the first camera coordinate frame;

based on the selected real-world element, select, from the set of multiple target images used to create the target map, a target image captured by a second camera, wherein (i) the selected real-world element is included in the target image and (ii) the target image is associated with a second camera coordinate frame attached to the second camera that differs from the respective map coordinate frame of the target map;

derive a geometric relationship between the first camera coordinate frame associated with the source image and the second camera coordinate frame associated with the target image, wherein the derived geometric relationship indicates a rotation offset and a translation offset between the first camera coordinate frame associated with the source image and the second camera coordinate frame associated with the target image, and wherein the geometric relationship is derived based on (i) a derived geometric relationship between respective pixel positions of matched features within the source and target images and (ii) respective camera intrinsics for the first and second cameras;

use the label associated with the source image and the derived geometric relationship between the first camera coordinate frame associated with the source image and the second camera coordinate frame associated with the target image to determine a third position of the selected real-world element according to the respective map coordinate frame of the target map; and encode the target map with map data for the selected real-world element that indicates the third position of the selected real-world element according to the respective map coordinate frame of the target map.

20. The computing system of claim 19, wherein the selected source and target images comprise a first pair of source and target images, and wherein the computing system further comprises program instructions stored on the non-transitory computer-readable medium that are executable by the at least one processor such that the computing system is configured to:

select, from the sets of source and target images, one or more additional pairs of source and target images that include the selected real-world element, wherein (i) the respective source image in each additional pair was captured by a respective first camera and is associated with a respective first camera coordinate frame attached to the respective first camera that differs from the respective map coordinate frame of the source map, (ii) the respective source image in each additional pair has an associated label that is indicative of a respective position of the selected real-world element according to the respective first camera coordinate frame associated with the respective source image, and (iii) the respective target image in each additional pair was captured by a respective second camera and is associated with a respective second camera coordinate frame attached to the respective second camera that differs from the respective map coordinate frame of the target map;

for each of the one or more additional pairs of source and target images, (i) derive a respective geometric relationship between the respective first camera coordinate frame associated with the respective source image in the additional pair and respective second camera coordinate frame associated with the respective target image in the additional pair, wherein the respective geometric relationship indicates a rotation offset and a translation offset between the respective first camera coordinate frame associated with the respective source image in the additional pair and the respective second camera coordinate frame associated with the respective target image in the additional pair and (ii) use the label associated with the respective source image in the additional pair and the respective geometric relationship between the respective first camera coordinate frame associated with the respective source image in the additional pair and the respective second camera coordinate frame associated with the respective target image in the additional pair to determine a respective position of the selected real-world element according to the respective map coordinate frame of the target map; and produce an aggregated position of the selected real-world element according to the respective map coordinate frame of the target map by aggregating (i) the third position of the selected real-world element according to the respective map coordinate frame of the target map that is determined based on the first pair of source and target images with (ii) the respective position of the selected real-world element according to the respective map coordinate frame of the target map that is determined based on each of the one or more additional pairs of source and target images.

* * * * *

UNITED STATES PATENT AND TRADEMARK OFFICE
CERTIFICATE OF CORRECTION

| | | |
|---|---|---|
| PATENT NO. | : 11,682,124 B2 | |
| APPLICATION NO. | : 16/916029 | |
| DATED | : June 20, 2023 | |
| INVENTOR(S) | : Ritwik Subir Das et al. | |

It is certified that error appears in the above-identified patent and that said Letters Patent is hereby corrected as shown below:

On the Title Page

Item (73), please change "Assignee: Lytt, inc." to "Assignee: Lyft, Inc."

Signed and Sealed this
Twenty-second Day of August, 2023

*Katherine Kelly Vidal*

Katherine Kelly Vidal
*Director of the United States Patent and Trademark Office*